US012745153B2

(12) United States Patent
Moon

(10) Patent No.: US 12,745,153 B2
(45) Date of Patent: Sep. 22, 2026

(54) METHOD AND DEVICE FOR ADJUSTING SCHEDULING IN WIRELESS COMMUNICATION SYSTEM

(71) Applicant: Samsung Electronics Co., Ltd., Suwon-si (KR)

(72) Inventor: Sangjun Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 18/472,799

(22) Filed: Sep. 22, 2023

(65) Prior Publication Data

US 2024/0114416 A1 Apr. 4, 2024

(30) Foreign Application Priority Data

Sep. 29, 2022 (KR) ........................ 10-2022-0124295

(51) Int. Cl.
*H04W 36/02* (2009.01)
*H04L 47/28* (2022.01)
(Continued)

(52) U.S. Cl.
CPC ............. *H04W 36/22* (2013.01); *H04L 47/28* (2013.01); *H04W 28/0268* (2013.01);
(Continued)

(58) Field of Classification Search
CPC ... H04W 36/22; H04W 36/142; H04W 72/23; H04W 28/0268; H04W 28/12;
(Continued)

(56) References Cited

U.S. PATENT DOCUMENTS 11,265,834 B2 * 3/2022 Wei ................... H04W 56/0015
11,395,244 B2 * 7/2022 Moon .................. H04W 76/25
(Continued)

FOREIGN PATENT DOCUMENTS

EP 4 030 678 A1 7/2022
EP 4 187 829 A1 5/2023
WO 2022/027523 A1 2/2022

OTHER PUBLICATIONS

3GPP TR 23.700-25 V1.0.0, 3rd Generation Partnership Project; Technical Specification Group Services and System Aspects; Study on timing resiliency and TSC and URLLC enhancements, (Release 18), Sep. 6, 2022.

(Continued)

*Primary Examiner* — Mounir Moutaouakil
(74) *Attorney, Agent, or Firm* — Jefferson IP Law, LLP

(57) ABSTRACT

The disclosure relates to a 5th generation (5G) or 6th-generation (6G) communication system for supporting a higher data transmission rate. An application function (AF) entity in a wireless communication system is provided. The AF entity includes a transceiver and at least one processor. The at least one processor may be configured to transmit, to a network entity, traffic schedule information including at least one of a periodicity range, and a burst arrival time (BAT) range, receive, from the network entity, information about at least one of a first periodicity and a first BAT, and adjust scheduling of an application based on the information about at least one of the first periodicity and the first BAT, wherein the information about at least one of the first periodicity and the first BAT is determined based on at least one of the periodicity range and the BAT range.

16 Claims, 19 Drawing Sheets

(51) Int. Cl.

| | |
|---|---|
| ***H04W 28/02*** | (2009.01) |
| ***H04W 36/14*** | (2009.01) |
| ***H04W 36/22*** | (2009.01) |
| ***H04W 72/0446*** | (2023.01) |
| ***H04W 72/23*** | (2023.01) |

(52) U.S. Cl.
CPC ..... *H04W 36/142* (2023.05); *H04W 72/0446* (2013.01); *H04W 72/23* (2023.01)

(58) Field of Classification Search
CPC .. H04W 72/0446; H04W 72/50; H04L 67/60; H04L 47/2475; H04L 47/28
See application file for complete search history.

(56) References Cited

U.S. PATENT DOCUMENTS

| | | | | |
|---|---|---|---|---|
| 11,516,078 | B2 * | 11/2022 | Moon | H04W 72/0446 |
| 11,678,288 | B2 * | 6/2023 | Kahn | H04W 56/0075 |
| | | | | 370/350 |
| 11,792,676 | B2 * | 10/2023 | Sun | H04W 28/24 |
| | | | | 370/229 |
| 11,877,251 | B2 * | 1/2024 | Feng | H04W 76/10 |
| 11,949,499 | B2 * | 4/2024 | Li | H04W 56/0015 |
| 11,956,746 | B2 * | 4/2024 | Newman | H04W 56/003 |
| 12,250,256 | B2 * | 3/2025 | Lee | H04L 43/087 |
| 12,273,836 | B2 * | 4/2025 | Minokuchi | H04W 56/001 |
| 12,308,951 | B2 * | 5/2025 | Kang | H04J 3/12 |
| 2020/0351804 | A1 * | 11/2020 | Moon | H04W 56/001 |
| 2022/0014296 | A1 | 1/2022 | Wang | |
| 2022/0046567 | A1 | 2/2022 | Kahn et al. | |
| 2022/0330185 | A1 * | 10/2022 | Moon | H04W 76/25 |

OTHER PUBLICATIONS

Nokia et al., Periodicity provisioning in RAN Feedback, S2-2205933, 3GPP TSG-SA WG2#152E e-meeting, Elbonia, Aug. 10, 2022.

Huawei, Burst Arrival Time adjustment, 3GPP TSG-CT3 Meeting #122e, C3-223107, E-Meeting, May 5, 2022.

Ericsson, RAN enhancements based on new QoS related parameters, TDoc R2-2100234, 3GPP TSG-RAN WG2 #113-e, Electronic meeting, Jan. 14, 2021.

Intel Corporation, Support for Survival Time and Burst Spread, R2-2100614, 3GPP TSG RAN WG2 Meeting #113e, e-Meeting, 25, Jan. 15, 2021.

International Search Report and Written Opinion dated Dec. 20, 2023, issued in International Patent Application No. International application No. PCT/KR2023/014515.

Extended European Search Report dated Sep. 25, 2025, issued in European Patent Application No. 23872973.5.

* cited by examiner

METHOD AND DEVICE FOR ADJUSTING SCHEDULING IN WIRELESS COMMUNICATION SYSTEM

CROSS-REFERENCE TO RELATED APPLICATION(S)

This application is based on and claims priority under 35 U.S.C. § 119(a) of a Korean patent application number 10-2022-0124295, filed on Sep. 29, 2022, in the Korean Intellectual Property Office, the disclosure of which is incorporated by reference herein in its entirety.

BACKGROUND

1. Field

The disclosure relates to a method for adjusting scheduling of an application according to the feedback of a base station when performing low-latency communication.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

When synchronization is supported between a 3rd generation partnership project (3GPP) communication network 5th generation system (5GS) and an external application (app) so that the NW-TT or DS-TT supports a (g) precision time protocol (PTP) message, and streams generated at regular intervals from the external application are transmitted through the communication network 5th generation system (5GS), the latency in the communication network should be considered and scheduling characteristics particularly in the radio access network (RAN) should be considered to meet low-latency requirements. However, presently, there is no method for transferring the scheduling characteristics of the external application to the RAN, nor is there a method for notifying the external application of the scheduling characteristics of the RAN. Thus, a method for addressing such issues is required.

Aspects of the disclosure are to address at least the above-mentioned problems and/or disadvantages and to provide at least the advantages described below. Accordingly, an aspect of the disclosure is to provide a method for adjusting scheduling of an application according to the feedback of a base station when performing low-latency communication.

Additional aspects will be set forth in part in the description which follows and, in part, will be apparent from the description, or may be learned by practice of the presented embodiments.

In accordance with an aspect of the disclosure, an application function (AF) entity in a wireless communication system is provided. The AF entity includes a transceiver and at least one processor. The at least one processor may be configured to transmit, to a network entity, traffic schedule information including at least one of a periodicity range, and a burst arrival time (BAT) range, receive, from the network entity, information about at least one of a first periodicity and a first BAT, and adjust scheduling of an application based on the information about at least one of the first periodicity and the first BAT, wherein the information about at least one of the first periodicity and the first BAT is determined based on at least one of the periodicity range and the BAT range.

In accordance with another aspect of the disclosure, a base station in a wireless communication system is provided. The base station includes a transceiver and at least one processor. The at least one processor may be configured to receive, from a network entity, traffic schedule information including at least one of a periodicity range, and a burst arrival time (BAT) range, determine information about at least one of a first periodicity and a first burst arrival time (BAT) based on the traffic schedule information, and transmit, to the network entity, the information about at least one of the first periodicity and the first BAT, wherein the information about at least one of the first periodicity and the first BAT is used to adjust scheduling of an application.

In accordance with another aspect of the disclosure, a method of an application function (AF) entity in a wireless communication system is provided. The method comprises transmitting, to a network entity, traffic schedule information including at least one of a periodicity range, and a burst arrival time (BAT) range; receiving, from the network entity, information about at least one of a first periodicity and a first BAT; and adjusting scheduling of an application based on the information about at least one of the first periodicity and the first BAT, wherein the information about at least one of the first periodicity and the first BAT is determined based on at least one of the periodicity range and the BAT range.

In accordance with another aspect of the disclosure, a method of a base station in a wireless communication system is provided. The method comprises receiving, from a network entity, traffic schedule information including at least one of a periodicity range, and a burst arrival time (BAT) range, determining information about at least one of a first periodicity and a first burst arrival time (BAT) based on the traffic schedule information, and transmitting, to the network entity, the information about at least one of the first periodicity and the first BAT, wherein the information about at least one of the first periodicity and the first BAT is used to adjust scheduling of an application.

In accordance with an aspect of the disclosure, an application function (AF) entity in a wireless communication system is provided. The AF entity includes a transceiver and at least one processor. The at least one processor may be configured to transmit traffic schedule information, receive information about a first period and a first burst arrival time (BAT), and adjust scheduling of an application based on the first period and the first BAT.

In accordance with another aspect of the disclosure, a base station in a wireless communication system is provided. The base station includes a transceiver and at least one processor. The at least one processor may be configured to receive traffic schedule information, identify a scheduling characteristic, determine a first period and a first burst arrival time (BAT) based on the traffic schedule information and the scheduling characteristic, and transmit the first period and the first BAT to a network entity.

A RAN may consider optimal scheduling by a method for transferring a scheduling characteristic of an external application to the RAN, and the external application may adjust scheduling by applying the characteristics of 5GS by a method for notifying the external application of the scheduling characteristics of the RAN. Thus, low-latency requirements may be met.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, It should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, terms for identifying access nodes, terms denoting network entities, terms denoting messages, terms denoting inter-network entity interfaces, and terms denoting various pieces of identification information are provided as an example for ease of description. Thus, the disclosure is not limited by the terms, and such terms may be replaced with other terms denoting objects with equivalent technical concept.

For ease of description, the terms and names defined in the latest 3rd generation partnership project 5G and NR standards among the current communication standards are used herein. However, the disclosure is not limited by such terms and names and may be likewise applicable to wireless communication networks conforming to other standards. In particular, the disclosure may be applied to 3GPP GS/NR (5th generation mobile communication standards).

When used for applications, such as smart grid, accurate time sync between UEs is required. In this case, time sync between UEs may use the global navigation satellite system (GNSS) using satellite signals. However, if the GNSS becomes unavailable even for a moment, a problem may occur because accurate time sync between UEs may not be maintained.

Figure 1:
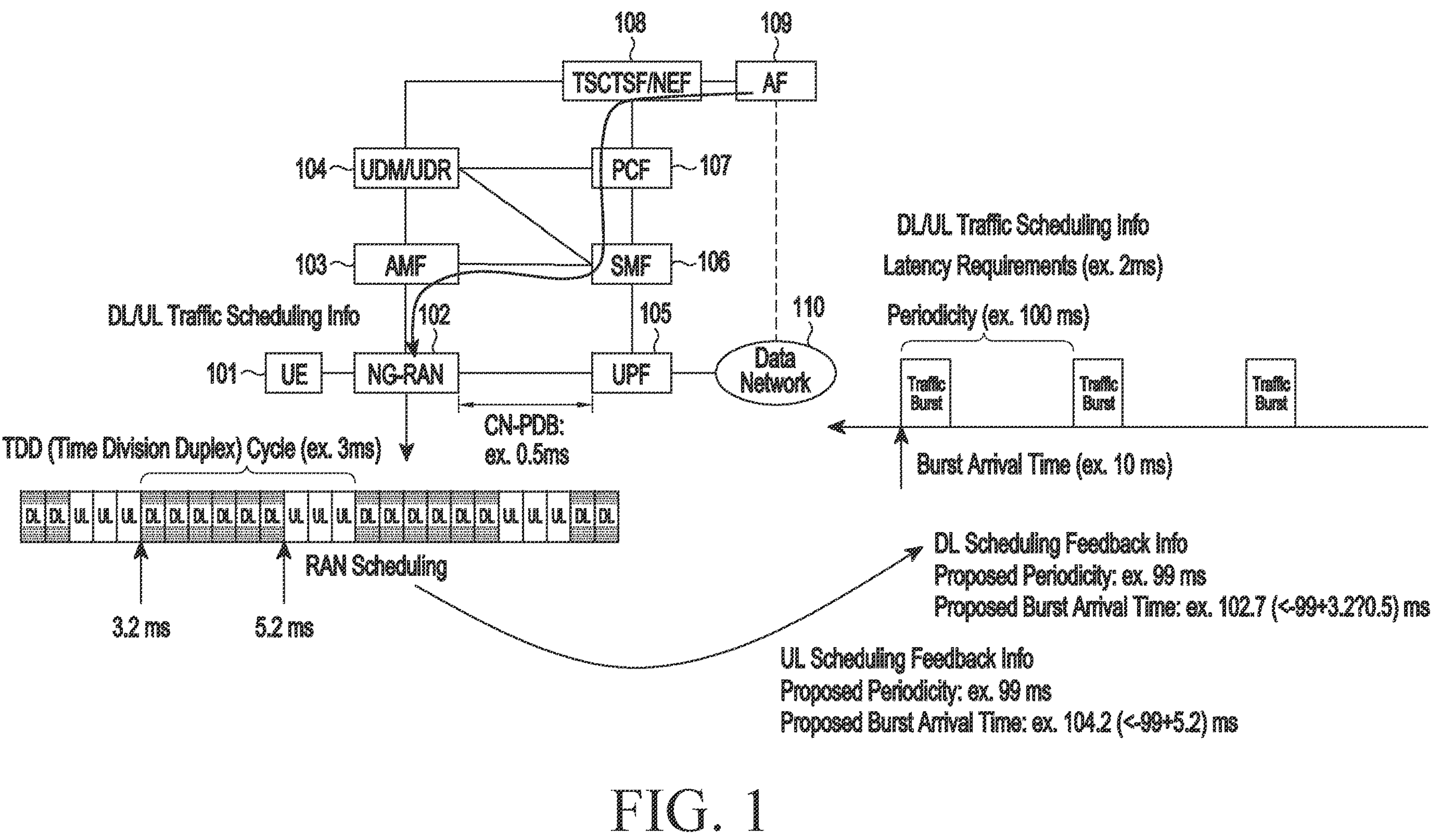
FIG. 1 is a view illustrating an example in which a scheduling characteristic of an external application and a scheduling characteristic of a 5GS RAN differ from each other according to an embodiment of the disclosure.

FIG. 1 is a view illustrating an example in which a scheduling characteristic of an external application and a scheduling characteristic of a 5GS RAN differ from each other according to an embodiment of the disclosure.

Referring to FIG. 1, the external application 109 (application, app, or application function AF) generates stream traffic at intervals of a predetermined time (e.g., 100 ms), every 10 ms, i.e., (100×K+10, where K is 0, 1, 2, . . . ) ms and transmits the stream traffic through a communication network (e.g., 3GPP network). The stream, in this case, may be a downlink (DL) stream transmitted from an external server to the UE 101 via the user plane function (UPF) 105 and the RAN (or next generation RAN (NG-RAN)) 102, or an uplink (UL) stream in which traffic generated by the UE 101 is directed to the external server via the NG-RAN 102 and the UPF 105. Further, a latency within 2 ms should be guaranteed when delivered. However, there is no method for transferring the traffic scheduling information to the NG-RAN 102.

The 5GS may guarantee a latency of 0.5 ms which is a core network packet delay Budget (CN-PDB) between the UPF 105 and the NG-RAN 102. In the scheduling in the NG-RAN 102, the cycle is repeated every 3 ms in a time division duplex (TDD) manner, and the DL transmission frame starts every 3.2 ms, i.e., (3×L+3.2, where L is 0, 1, 2, 3, . . . ), and a total of 6 frames continue, and the UL transmission frame starts every 5.2 ms, i.e., (3×M+5.2, where M is 0, 1, 2, . . . ), and a total of 3 frames are transmitted. When the DL traffic arrives at the NG-RAN 102 at the start of the last DL frame among the consecutive DL frames, the traffic may undergo a scheduling latency of at least 4 frames (i.e., 1 DL frame, 3 UL frame, total 4/3 ms). Also, when the UL traffic arrives at the NG-RAN 102 at the start of the last UL frame among the consecutive UL frames, the traffic may experience a scheduling delay of at least 7 frames (1 UL frame, 6 DL frame, total 7/3 ms). In other words, in the state in which the scheduling characteristics of each other are not known, the time when the stream traffic generated by the external application 109 arrives at the NG-RAN 102 does not match the TDD cycle of the NG-RAN 102, and thus the occurrence of the DL delay of the 4 frames or the UL delay of the 7 frames may not be avoided.

When the DL/UL traffic scheduling information of the external application 109 is shared with the NG-RAN 102, the NG-RAN 102 may provide the UL/DL scheduling feedback to the external application 109 by reflecting scheduling characteristics such as the information and the TDD cycle of the NG-RAN. For example, as the DL scheduling feedback information, 99 ms is provided as a proposed periodicity, 102.7 ms may be provided as a proposed burst arrival time, i.e., each (99×N+3.2-0.5, where N is 0, 1, 2, 3 . . . ms). Accordingly, when the external application server generates stream traffic and transmits the stream traffic through the downlink, the stream traffic may be transmitted to the UE 101 with the minimum scheduling delay in consideration of the scheduling of the RAN. For example, as the UL scheduling feedback information, 99 ms is provided as a proposed periodicity, 104.2 ms may be provided as a proposed burst arrival time, i.e., each (99×N+5.2, where N is 0, 1, 2, 3 . . . ms). Accordingly, when the UE 101 generates external application stream traffic and transmits the external application stream traffic through the uplink, the external application stream traffic may be transmitted to the external application server with the minimum scheduling delay in consideration of the scheduling of the RAN. The stream may alternatively transmit through a unified data repository (UDR)/unified data management (UDM) 104. The AF 109 and UE 101 are part of the data network 110.

Figure 2:
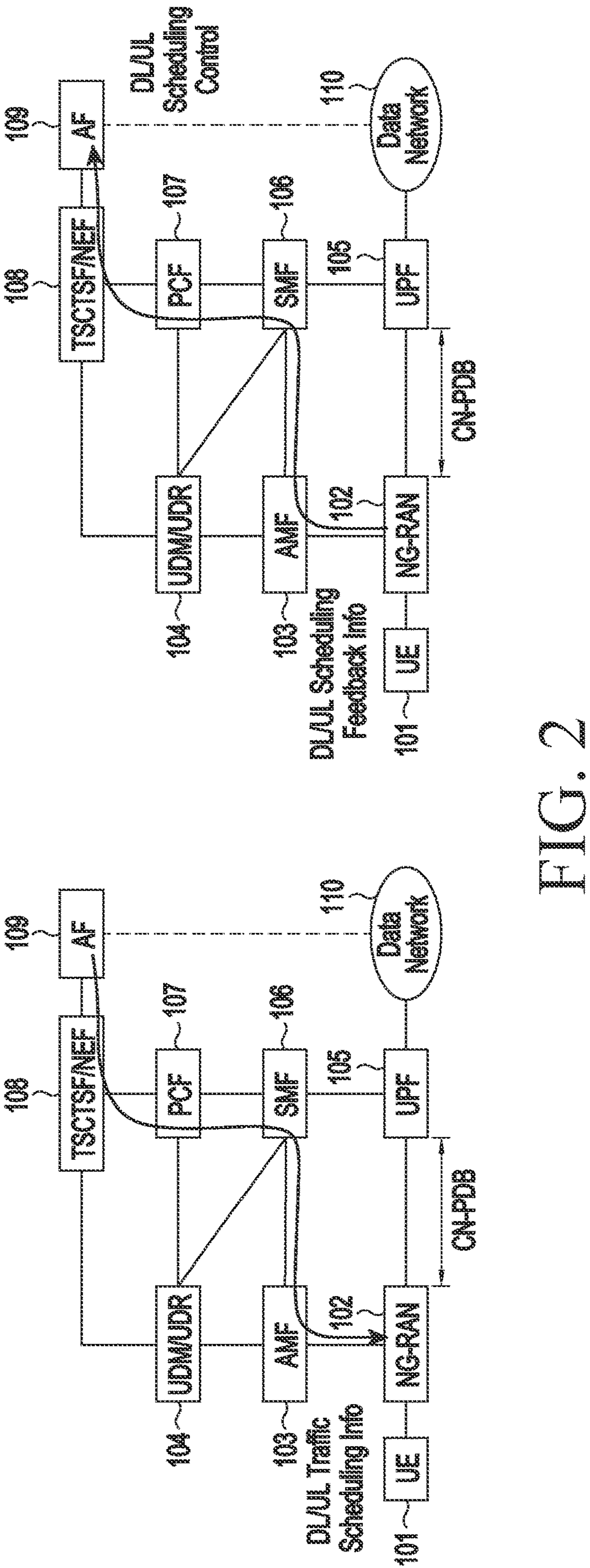
FIG. 2 illustrates a method for transferring a scheduling characteristic of an external application to a RAN and an embodiment of notifying the external application of a scheduling characteristic of the RAN according to an embodiment of the disclosure.

FIG. 2 illustrates a method for transferring a scheduling characteristic of an external application to a RAN and an embodiment of notifying the external application of a scheduling characteristic of the RAN according to an embodiment of the disclosure.

Referring to FIG. 2, in order to transfer the scheduling characteristic of the external application to the RAN, the AF (i.e., external application 109) transfers the UL/DL traffic scheduling information to the time-sensitive communication and time synchronization function (TSCTSF) 108 directly or via a network exposure function (NEF). The TSCTSF 108 determines whether the subscriber may process the information by referring to the information, and then transmits the information to the policy control function (PCF) 107. The PCF 107 identifies whether the quality of service (QoS)-related requirement may be met, determines whether the related processing is possible, and then transmits the information to the session management function (SMF) 106. The SMF 106 further processes the information and modifies it into information that may be transferred to the NG-RAN 102, and then transfers the modified information to the access and mobility management function (AMF) 103. The AMF 103 transfers the modified information to the NG-RAN 102 for the corresponding flow of the corresponding UE.

The UL/DL traffic schedule information may include source/destination (src/dst) address/port, application identifier (ID), required bit rate, scheduling adaptation capability indication, initial periodicity, periodicity-range (P-range), initial burst arrival time (BAT), BAT-range, and required latency. Scheduling adaptation capability indication is a parameter indicating whether the external application may adjust scheduling. P-range is a periodicity range and represents a possible range in which the external application may adjust the periodicity. BAT-range indicates a possible range in which the external application may adjust the burst arrival time.

In order to inform the external application of the scheduling characteristics of the RAN 102, the RAN 102 may identify that the external application may adjust the scheduling through the scheduling application capability indication. Alternatively, the RAN 102 may identify that the external application may adjust scheduling by identifying whether the information received from the network includes P-range or BAT-range. The RAN 102 may generate or determine the proposed periodicity in consideration of the initial periodicity and the P-range. Further, the proposed BAT may be generated or determined in consideration of the initial BAT and the BAT-range. The RAN 102 transfers the so-created proposed periodicity and proposed BAT to the AMF 103. Alternatively, the RAN 102 may leave the role of creating the proposed periodicity and the proposed BAT to another network function (NF) and simply transmit only scheduling characteristics including TDD cycle information to the AMF 103. The AMF 103 may send information received from the RAN 102 to the SMF 106. The SMF 106 may perform a necessary modification task, such as conversion between the master times referred to between the external application and the 5GS system, on the information received from the AMF 103. The SMF 106 may transfer the converted information to the PCF 107. The PCF 107 transfers the information received from the SMF 106 to the TSCTSF 108. The TSCTSF 108 may identify whether the proposed periodicity meets the required initial periodicity and P-range conditions and whether the proposed BAT meets the required initial BAT and BAT-range conditions. According to an embodiment, when the information transferred from the RAN 102 simply includes only scheduling characteristics such as TDD cycle information, the TSCTSF 108 may generate or determine a proposed periodicity matching the required initial periodicity and P-range conditions, and may generate or determine a proposed BAT matching the required initial BAT and BAT-range conditions. Thereafter, the TSCTSF 108 may transfer the identified information or directly generated information to the NEF 108. The NEF transfers the information back to the AF (i.e., external application 109). The AF (i.e., external application 109) may adjust application scheduling based on this scheduling information. In other words, for DL scheduling, the stream generation and transmission time of the server are adjusted, and for UL scheduling, the stream generation and transmission time of the UE are adjusted.

There are various variations in how to create the proposed periodicity and proposed BAT, but for example, it is generated as follows. However, it is not limited to the following methods.

Proposed Periodicity=(K×TDD_cycle), k=0, 1, 2, . . . which minimizes Absolute value (Proposed periodicity−initial periodicity) and Proposed Periodicity lies in P-Range Proposed BAT=(M×TDD_cycle)+first UL frame Range, M=0, 1, 2, . . . , which minimizes Absolute value (Proposed BAT−initial BAT), Proposed BAT lies in B-Range Proposed BAT=(N×TDD_cycle)+first DL frame Range-CN_PDB, M=0, 1, 2, . . . , which minimizes Absolute value (Proposed BAT−initial BAT), Proposed BAT lies in B-Range The information for transferring the scheduling characteristics of the RAN (e.g., DL/UL scheduling feedback info) may include src/dst address/port, application ID, required bit rate, proposed periodicity, proposed BAT, and required latency.

Figure 3A:
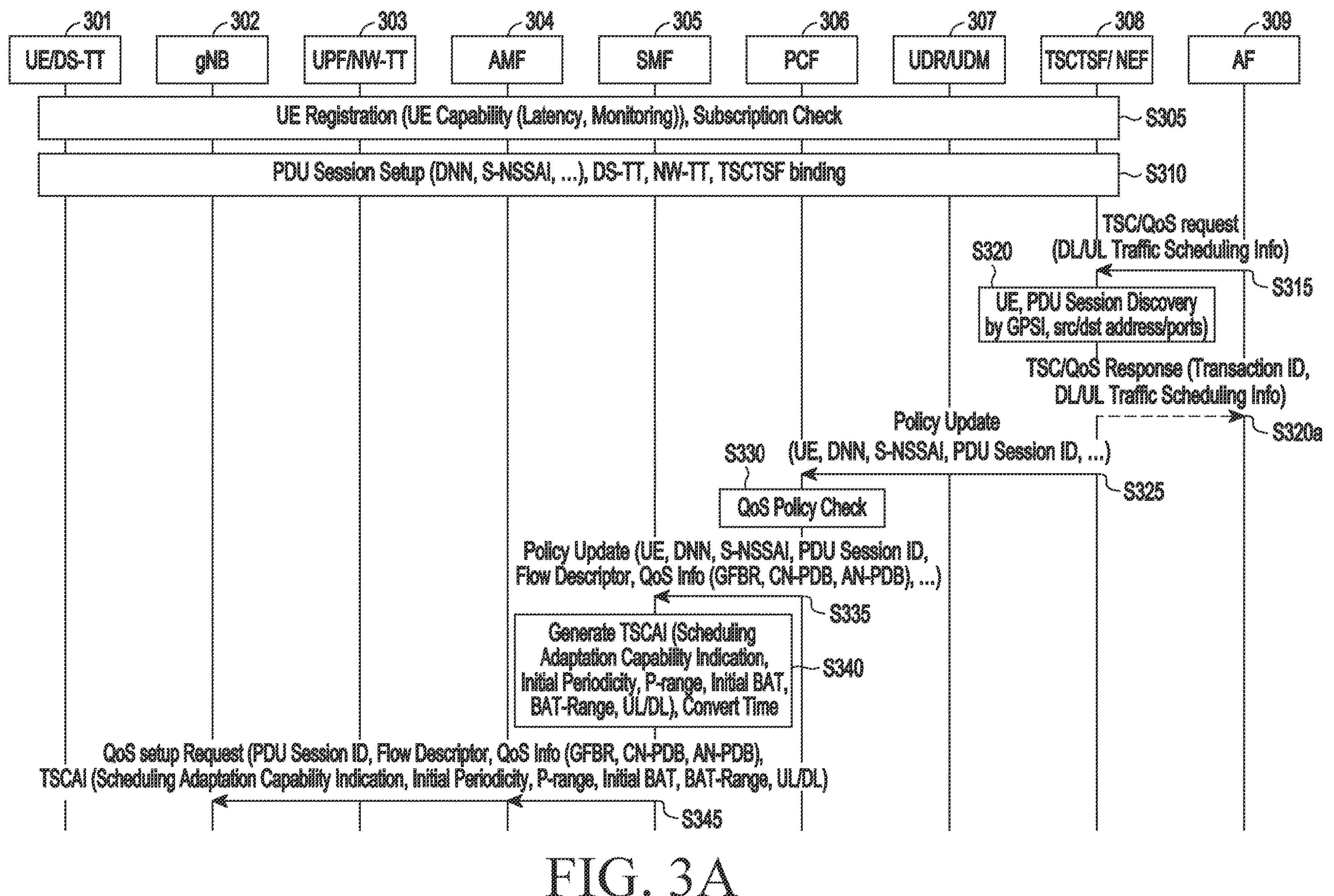
FIGS. 3A and 3B illustrate a first method for adjusting scheduling by an AF according to various embodiments of the disclosure.
Figure 3B:
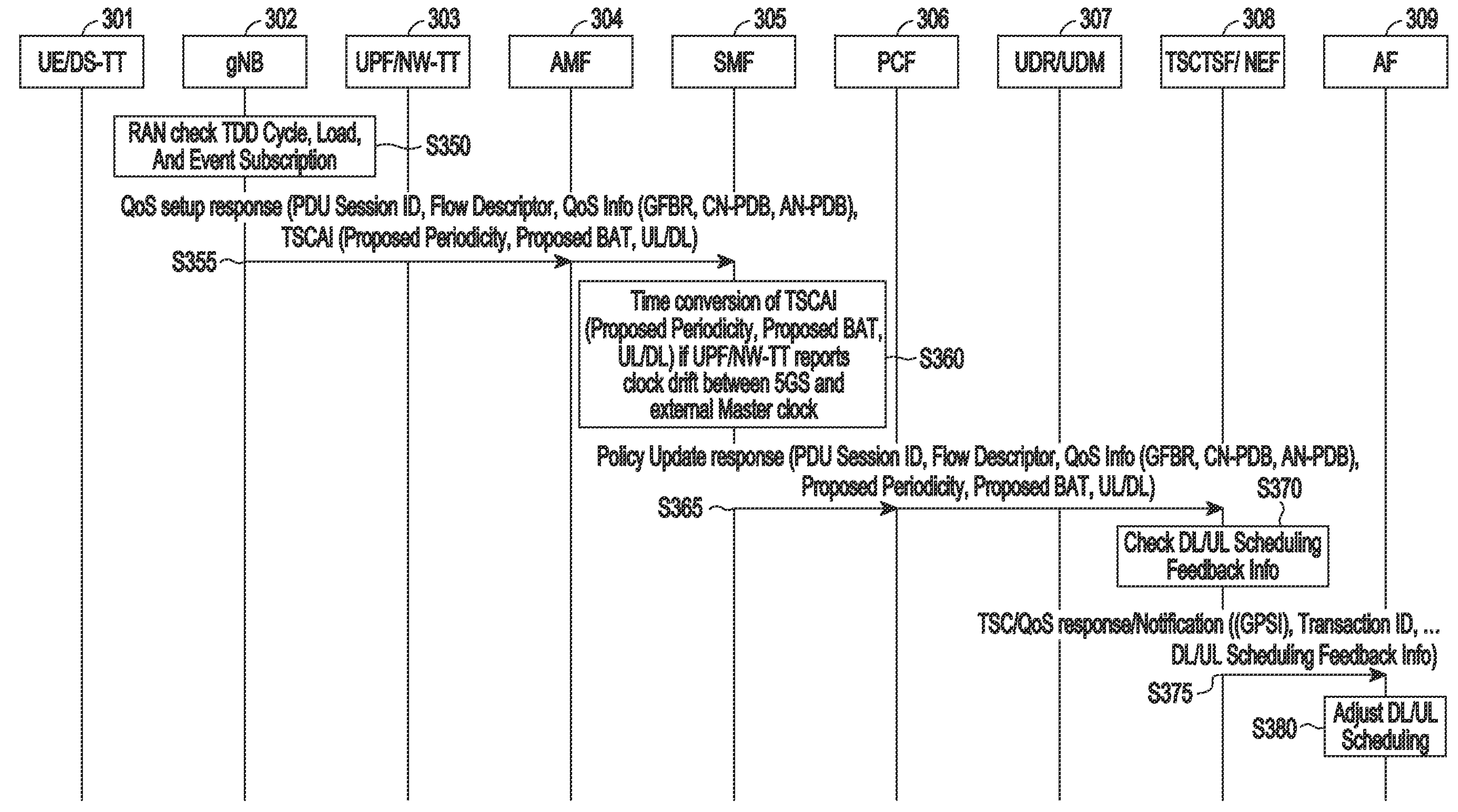

FIGS. 3A and 3B illustrate a first method for adjusting scheduling by an AF according to various embodiments of the disclosure.

Referring to FIG. 3, in operation S305, the UE 301 may perform registration on the 5GS. In this case, the UE 301 may be in a state of subscribing to a low-latency service and a monitoring service.

In operation S310, the UE 301 may set a packet data unit (PDU) session. In this case, time synchronization with the external application server may be maintained through a device-side TSN translator (DS-TT) positioned in the UE 301 and a network-side TSN translator (NW-TT) positioned in the NW-TT/UPF 303. In this case, the master clock referred to by the external application and the master clock referred to by the 5GS may be completely the same or different. When the master clock referred to by the external application is different from the master clock referred to by the 5GS, the NW-TT may identify, and update with, the difference and transmit the same to the SMF 305. Further, when interworking with an external application function, binding with the TSCTSF 308 in charge of a function related to time synchronization may be performed.

In operation S315, the AF 309 may transfer a time-sensitive communications (TSC)/QoS request to the TSCTSF 308 directly or via the NEF 308 or via a UDR/UDM 307. The request may include traffic schedule information (e.g., DL/UL traffic scheduling info). The traffic schedule information may include at least one of GPSI, source/destination (src/dst), address/port, application ID, required bit rate, scheduling adaptation capability indication, initial periodicity, P-range, initial BAT, BAT-range, UL/DL, and required latency. The global public subscription identifier (GPSI) indicates the identifier of the UE that may be referred to outside the 5GS and may include an IP address or an Ethernet address. Scheduling adaptation capability indication indicates whether the external application may adjust scheduling. Periodicity range (P-range) indicates a range of periodicity that may be adjusted by the external application. BAT-range indicates a range of burst arrival time that may be adjusted by the external application.

In operation S320, the TSCTSF or the NEF 308 may discover the UE 301 and discover the PDU session. In this case, GPSI and src/dst address/ports may be utilized. In this case, the TSCTSF 308 may determine whether the information may be processed by referring to subscriber information.

In operation S320*a*, the TSCTSF or the NEF 308 may transfer a TSC/QoS response message to the AF 309. The response message may include a transaction ID and DL/UL traffic scheduling info.

In operation S325, the TSCTSF 308 may transfer the information received from the AF in operation S315 to the UE discovered in operation S320 and the PCF 306 bound to the PDU session. The transfer request may include traffic schedule information, UE id, DNN, S-NSSAI, PDU session ID, src/dst address/port, required bit rate, scheduling adaptation capability indication, initial periodicity, P-range, initial BAT, BAT-range, UL/DL, and required latency.

In operation S330, the PCF 306 may determine whether the QoS-related requirement may be met and determine whether the QoS-related requirement may be processed. A guaranteed flow bit rate (GFBR) capable of achieving the required bit rate, a core network packet delay budget (CN-PDB) capable of achieving the required bit rate, and an access network packet delay budget (AN-PDB) may be mapped to QoS Info.

In operation S335, the PCF 306 may transfer the information identified in operation S330 to the SMF 305. The information may include at least one of UE id, DNN, S-NSSAI, PDU session ID, flow descriptor, QoS info (GFBR, CN-PDB, AN-PDB), scheduling adaptation capability indication, initial periodicity, P-range, initial BAT, BAT-range, and UL/DL received from the TSCTSF 308. The flow descriptor may include src/dst address/port and application ID.

In operation S340, the SMF 305 may generate time synchronization assistance information (e.g., TSC assistance information (TSCAI)). In this case, when the master clock referred to by the external application is different from the master clock referred to by the 5GS, the NW-TT/UPF 303 may identify, and update with, the difference and transmit the same to the SMF 305. The SMF 305 may change the information specified based on the external time to the 5GS time by reflecting the received difference information. In this case, the TSCAI may include scheduling adaptation capability indication, initial periodicity, P-range, initial BAT, BAT-range, and UL/DL.

In operation S345, the SMF 305 may transfer the generated information to the AMF 304 through a request message (e.g., a QoS setup request message), and the AMF 304 may transfer the information to the NG-RAN 302. The transferred information may include at least one of PDU session ID, flow descriptor, QoS info (GFBR, CN-PDB, AN-PDB), and TSCAI (scheduling adaptation capability indication, initial periodicity, P-range, initial BAT, BAT-range, and UL/DL).

In operation S350, the NG-RAN 302 may identify scheduling characteristic information such as TDD cycle, and identify that the external application may adjust scheduling based on the received scheduling adaptation capability indication. Or, the NG-RAN 302 may identify that the external application may adjust scheduling by identifying whether the received information includes P-range or BAT-range. The NG-RAN 302 may determine or generate the proposed periodicity in consideration of at least one of the initial periodicity and the P-range. Further, the proposed BAT may be determined or generated in consideration of at least one of the initial BAT and the BAT-range. Further, when the scheduling information is updated due to a scheduling characteristic such as a TDD cycle being configured, or scheduling information such as a TDD cycle of a newly connected cell being updated due to a handover of the UE, the NG-RAN 302 may determine the updated proposed periodicity and the proposed BAT and may perform subscription so as to transfer the determined proposed periodicity and proposed BAT to the SMF 305.

In operation S355, the NG-RAN 302 may transmit the determined or generated proposed periodicity and proposed BAT to the SMF 305 via the AMF 304 as a response message (e.g., a QoS setup response message). In this case, the response message may include PDU session ID, flow descriptor, QoS info (GFBR, CN-PDB, AN-PDB), and TSCAI (proposed periodicity, proposed BAT, and UL/DL).

In operation S360, the SMF 305 may perform time conversion on the proposed periodicity and the proposed BAT if necessary. The SMF 305 may change the 5GS time reference to the external time reference in a manner opposite to the manner performed in operation S340.

In operation S365, the SMF 305 may transfer the updated information to the TSCTSF 308 via the PCF 306. The response message (e.g., policy update response) for transferring the updated information may include PDU session ID, flow descriptor, QoS info (GFBR, CN-PDB, AN-PDB), proposed periodicity, proposed BAT, and UL/DL.

In operation S370, the TSCTSF 308 may identify whether the proposed periodicity meets the required initial periodicity and P-range conditions and whether the proposed BAT meets the required initial BAT and BAT-range conditions. It is possible to verify again whether other information in the DL/UL scheduling feedback info that has been sent also meets the conditions.

In operation S375, the TSCTSF 308 may transmit a response to the TSC/QoS request received in operation S325 to the AF 309 directly or via the NEF. In this case, if the TSCTSF 308 has already sent a response to the TSC/QoS request in operation 320*a*, the TSCTSF 308 may transmit information to the AF 309 in the TSC/QoS notification format. The message transmitted to the AF 309 may include GPSI, transaction ID, and DL/UL scheduling feedback info. The DL/UL scheduling feedback info may include src/dst address/port, application ID, required bit rate, proposed periodicity, proposed BAT, and required latency.

In operation S380, the AF 309 may adjust application scheduling based on the information received from the TSCTSF 308. In other words, for DL scheduling, the stream generation and transmission time of the server may be adjusted, and for UL scheduling, the stream generation and transmission time of the UE may be adjusted.

Figure 4:
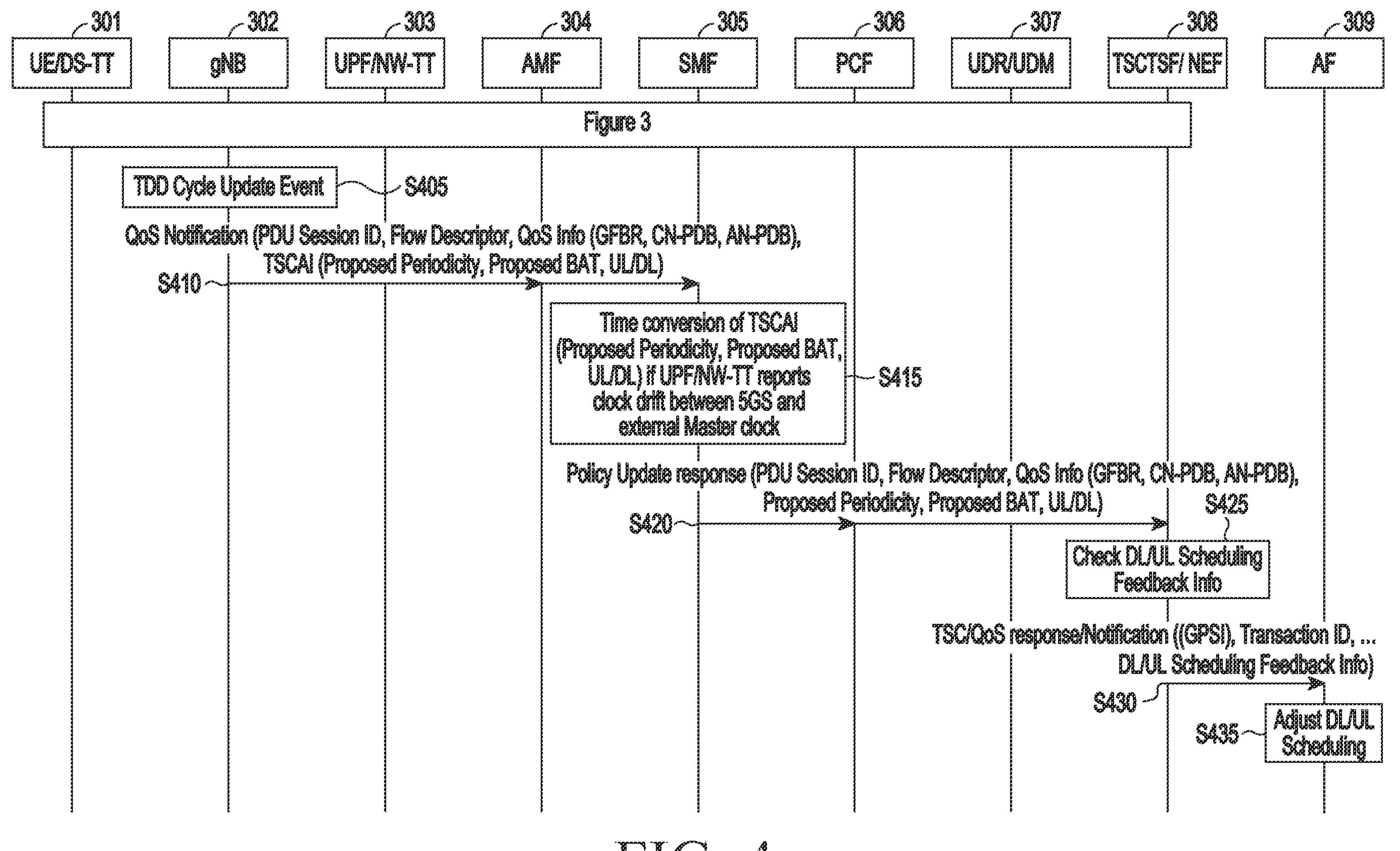
FIG. 4 illustrates a method for adjusting scheduling when a scheduling characteristic or information is changed after the operations of FIGS. 3A and 3B according to an embodiment of the disclosure.

FIG. 4 illustrates a method for adjusting scheduling when a scheduling characteristic or information is changed after the operations of FIGS. 3A and 3B according to an embodiment of the disclosure.

Referring to FIG. 4, after operation S380 is performed in operation S305 of FIGS. 3A and 3B, the NG-RAN 302 may update the proposed periodicity and the proposed BAT based on the updated scheduling characteristic or information when it is identified that the scheduling characteristic such as the TDD cycle is reconfigured or the scheduling information such as the TDD cycle of the newly connected cell is updated by the handover of the UE operation S405.

In operation S410, the NG-RAN 302 may transfer the updated proposed periodicity and proposed BAT to the SMF 305 via the AMF 304. In this case, the transferred information may include PDU session ID, flow descriptor, QoS info (GFBR, CN-PDB, and AN-PDB), and TSCAI (proposed periodicity, proposed BAT, and UL/DL).

In operation S415, the SMF 305 may perform time conversion on the proposed periodicity and the proposed BAT as needed. The time conversion method may be a method similar to the method performed in operation S360 of FIG. 3B.

In operation S420, the SMF 305 may transfer the updated period and BAT information to the TSCTSF 308 via the PCF 306. In this case, the transferred information may include at least one of PDU session ID, flow descriptor, QoS info (GFBR, CN-PDB, AN-PDB), proposed periodicity, proposed BAT, and UL/DL.

In operation S425, the TSCTSF 308 may identify whether the updated proposed periodicity meets the required initial periodicity and P-range conditions and whether the proposed BAT meets the required initial BAT and BAT-range conditions. It may be verified again whether other information in the DL/UL scheduling feedback info meets the conditions.

In operation S430, the TSCTSF 308 may transfer information to the AF 309 directly or via the NEF or directly in a TSC/QoS notification format. In this case, the transferred message may include at least one of GPSI, transaction ID, and DL/UL scheduling feedback info. The DL/UL scheduling feedback info may include at least one of src/dst address/port, application ID, required bit rate, proposed periodicity, proposed BAT, and required latency.

In operation S435, the AF 309 may re-adjust the application scheduling based on the received updated information. In other words, for DL scheduling, the stream generation and transmission time of the server may be adjusted, and for UL scheduling, the stream generation and transmission time of the UE may be adjusted.

Figure 5A:
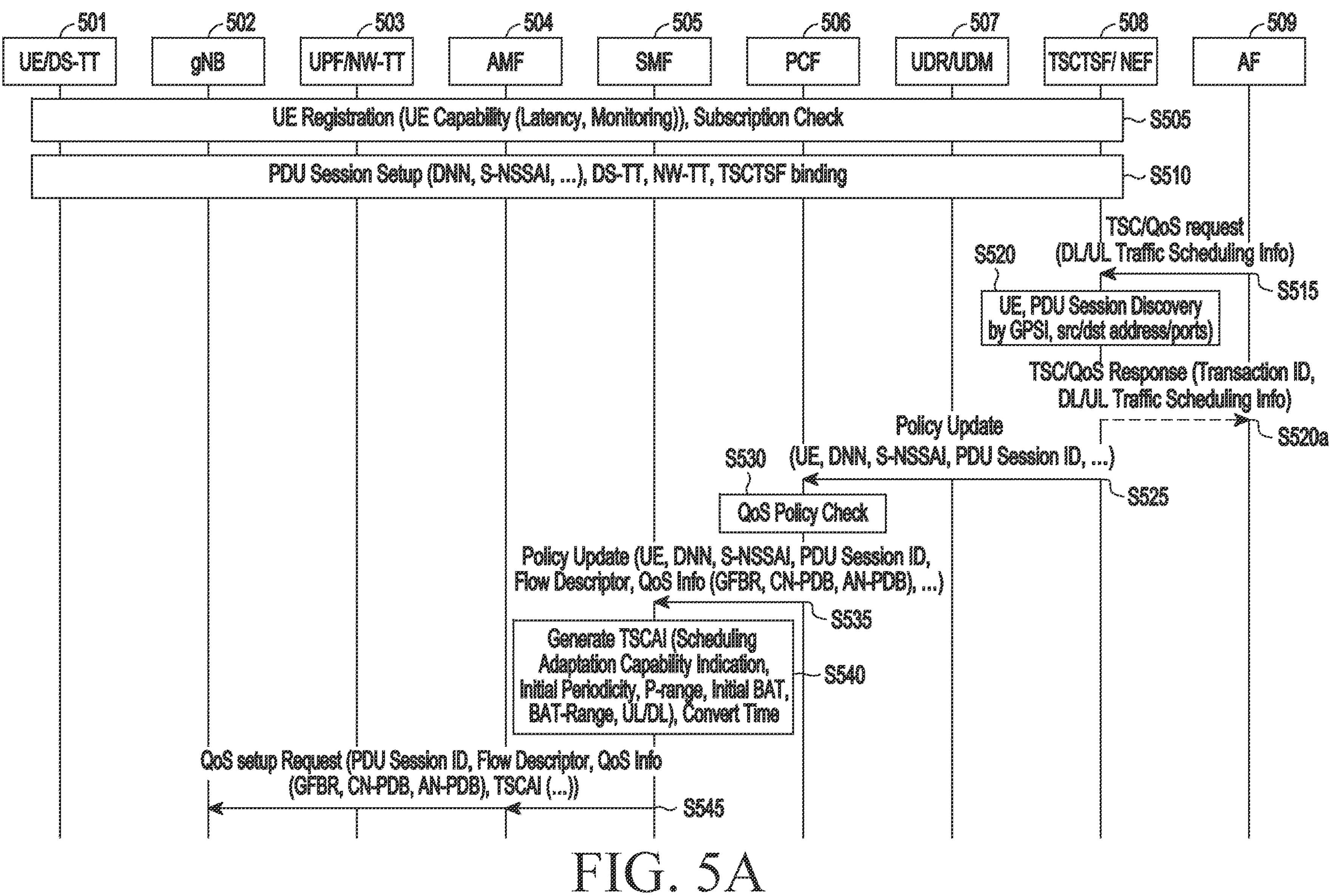
FIGS. 5A and 5B illustrate a second method for adjusting scheduling by an AF according to various embodiments of the disclosure.
Figure 5B:
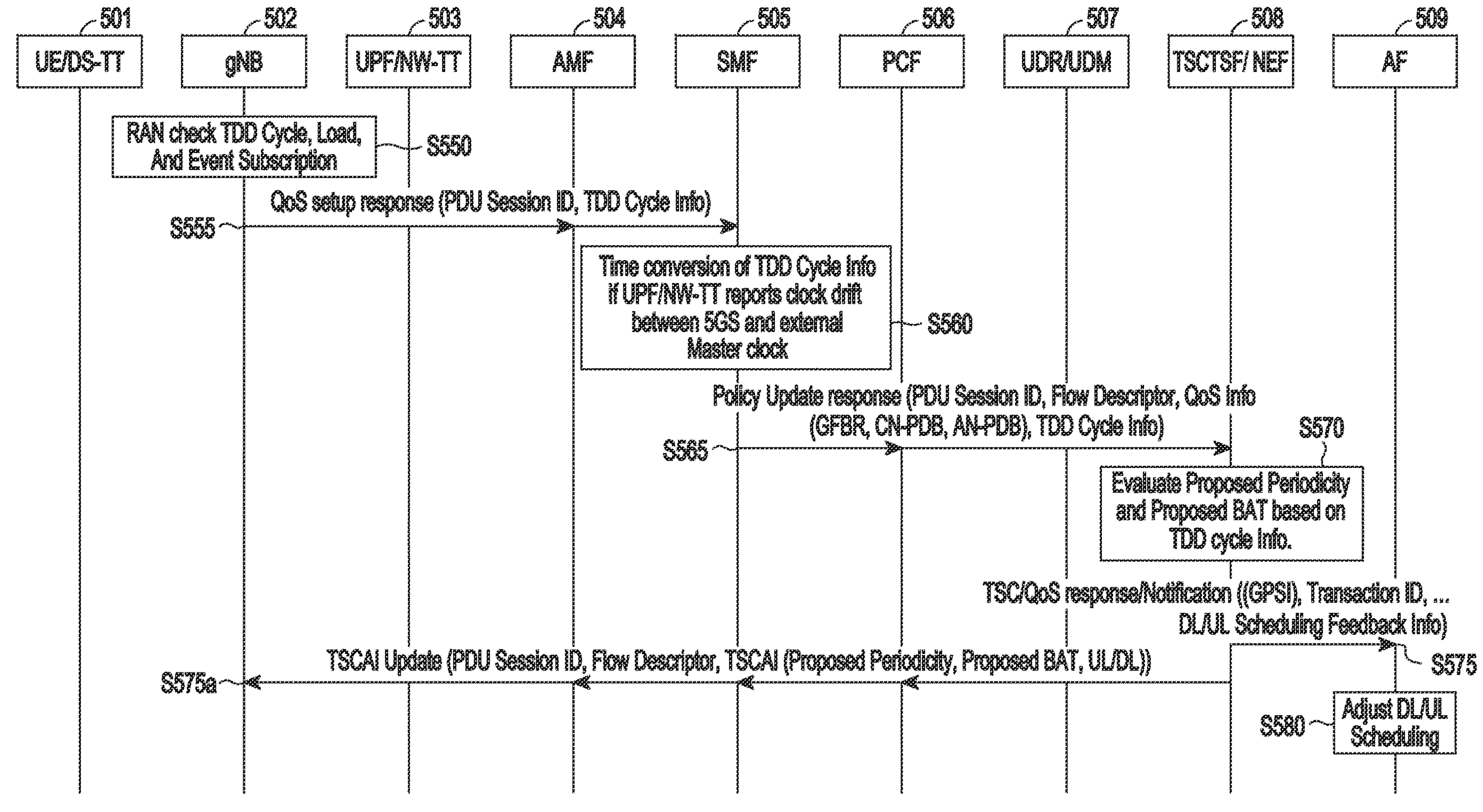

FIGS. 5A and 5B illustrate a second method for adjusting scheduling by an AF according to various embodiments of the disclosure.

Referring to FIGS. 5A and 5B, in operation S505, the UE 501 may perform registration on the 5GS. In this case, the UE 501 may be in a state of subscribing to a low latency service and a monitoring service.

In operation S510, the UE 501 may set a PDU session. In this case, time synchronization with the external application server may be maintained through a device side TSN translator (DS-TT) positioned in the UE 501 and a network side TSN translator (NW-TT) positioned in the UPF 503. In this case, the master clock referred to by the external application and the master clock referred to by the 5GS may be completely the same or different. When the master clock referred to by the external application is different from the master clock referred to by the 5GS, the NW-TT may identify, and update with, the difference and transmit the same to the SMF 505. Further, when interworking with an external application function, binding with the TSCTSF 508 in charge of a function related to time synchronization may be performed.

In operation S515, the AF 509 may transfer a time sensitive communications (TSC)/QoS request to the TSCTSF 508 directly or via the NEF 508 or via a UDR/UDM 507. The request may include traffic schedule information (e.g., DL/UL traffic scheduling info). The traffic schedule information may include at least one of GPSI, source/destination (src/dst), address/port, application ID, required bit rate, scheduling adaptation capability indication, initial periodicity, P-range, initial BAT, BAT-range, UL/DL, and required latency. The global public subscription identifier (GPSI) indicates the identifier of the UE that may be referred to outside the 5GS and may include an IP address or an Ethernet address. Scheduling adaptation capability indication indicates whether the external application may adjust scheduling. Periodicity range (P-range) indicates a range of periodicity that may be adjusted by the external application. BAT-range indicates a range of burst arrival time that may be adjusted by the external application.

In operation S520, the TSCTSF or the NEF 508 may discover the UE 501 and discover the PDU session. In this case, GPSI and src/dst address/ports may be utilized. In this case, the TSCTSF 508 may determine whether the information may be processed by referring to subscriber information.

In operation S520*a*, the TSCTSF or the NEF 508 may transfer a TSC/QoS response message to the AF 509. The response message may include a transaction ID and a DL/UL traffic scheduling info.

In operation S525, the TSCTSF 508 may transfer the information received from the AF in operation S515 to the UE discovered in operation S520 and the PCF 506 bound to the PDU session. The transfer request may include traffic schedule information, UE id, DNN, S-NSSAI, PDU session ID, src/dst address/port, required bit rate, scheduling adaptation capability indication, initial periodicity, P-range, initial BAT, BAT-range, UL/DL, and required latency.

In operation S530, the PCF 506 may determine whether the QoS-related requirement may be met and determine whether the QoS-related requirement may be processed. A guaranteed flow bit rate (GFBR) capable of achieving the required bit rate, a core network packet delay budget (CN-PDB) capable of achieving the required bit rate, and an access network packet delay budget (AN-PDB) may be mapped to QoS Info.

In operation S535, the PCF 506 may transfer the information identified in operation S530 to the SMF 505. The information may include at least one of UE id, DNN, S-NSSAI, PDU session ID, flow descriptor, QoS info (GFBR, CN-PDB, AN-PDB), scheduling adaptation capability indication, initial periodicity, P-range, initial BAT, BAT-range, and UL/DL received from the TSCTSF 508. The flow descriptor may include src/dst address/port and application ID.

In operation S540, the SMF 505 may generate time synchronization assistance information (e.g., TSC assistance information (TSCAI)). In this case, when the master clock referred to by the external application is different from the master clock referred to by the 5GS, the NW-TT 503 may identify, and update with, the difference and transmit the same to the SMF 505. The SMF 505 may change the information specified based on the external time to the 5GS time by reflecting the received difference information. In this case, the TSCAI may include scheduling adaptation capability indication, initial periodicity, P-range, initial BAT, BAT-range, and UL/DL.

In operation S545, the SMF 505 may transfer the generated and converted information to the AMF 504 through a request message (e.g., a QoS setup request message), and the AMF 504 may transfer the information to the NG-RAN 502. The transferred information may include at least one of PDU session ID, flow descriptor, QoS info (GFBR, CN-PDB, AN-PDB), and TSCAI (scheduling adaptation capability indication, initial periodicity, P-range, initial BAT, BAT-range, and UL/DL).

In operation S550, the NG-RAN 502 may identify scheduling characteristic information such as TDD cycle, and identify that the external application may adjust scheduling based on the received scheduling adaptation capability indication. Or, the NG-RAN 502 may identify that the external application may adjust scheduling by identifying whether the received information includes P-range or BAT-range. The NG-RAN 502 may transmit only scheduling characteristics such as TDD cycle information to the AMF 504. Further, when the scheduling information is updated due to a scheduling characteristic such as a TDD cycle being configured, or scheduling information such as a TDD cycle of a newly connected cell being updated due to a handover of the UE, the NG-RAN 502 may determine the updated proposed periodicity and the proposed BAT and may perform subscription so as to transfer the updated scheduling information to the SMF 505.

In operation S555, the NG-RAN 502 may transmit a scheduling characteristic such as TDD cycle information to the SMF 505 via the AMF 504. The AMF 504 may transmit information received from the NG-RAN 502 to the SMF 505 as a response message (e.g., a QoS setup response message). In this case, the response message may include PDU session ID, flow descriptor, QoS info (GFBR, CN-PDB, and AN-PDB), and TDD cycle info.

In operation S560, the SMF 505 may perform time conversion on the TDD cycle info if necessary. The SMF 505 may change the 5GS time reference to the external time reference in a manner opposite to the manner performed in operation S540.

In operation S565, the SMF 505 may transfer the converted information to the TSCTSF 508 via the PCF 506. The response message (e.g., policy update response) for transferring the updated information may include PDU session ID, flow descriptor, QoS info (GFBR, CN-PDB, AN-PDB), and TDD cycle info.

In operation S570, the TSCTSF 508 may generate a proposed periodicity matching the required initial periodicity and P-range conditions, and generate a proposed BAT matching the required initial BAT and BAT-range conditions. Further, the TSCTSF 508 may identify whether the generated proposed periodicity meets the required initial periodicity and P-range conditions and whether the generated proposed BAT meets the required initial BAT and BAT-range conditions. It is possible to verify again whether other information in the DL/UL scheduling feedback info that has been sent also meets the conditions.

In operation S575, the TSCTSF 508 may transmit a response to the TSC/QoS request received in operation S515 to the AF 509 directly or via the NEF. In this case, if the TSCTSF 508 has already sent a response to the TSC/QoS request in operation 520*a*, the TSCTSF 308 may transmit information to the AF 509 in the TSC/QoS notification format. The message transmitted to the AF 509 may include GPSI, transaction ID, and DL/UL scheduling feedback info. The DL/UL scheduling feedback info may include src/dst address/port, application ID, required bit rate, proposed periodicity, proposed BAT, and required latency.

In operation S575*a*, the TSCTSF 508 may send an update request (e.g., a TSCAI update request) including the proposed periodicity and the proposed BAT to the SMF 505 via the PCF 506. The SMF 505 may generate the TSCAI to include the received information and transmit it to the NG-RAN 502 via the AMF 504. The NG-RAN 502 may use the information for scheduling a corresponding flow.

In operation S580, the AF 509 may adjust application scheduling based on the information received from the TSCTSF 508. In other words, for DL scheduling, the stream generation and transmission time of the server may be adjusted, and for UL scheduling, the stream generation and transmission time of the UE may be adjusted.

Figure 6:
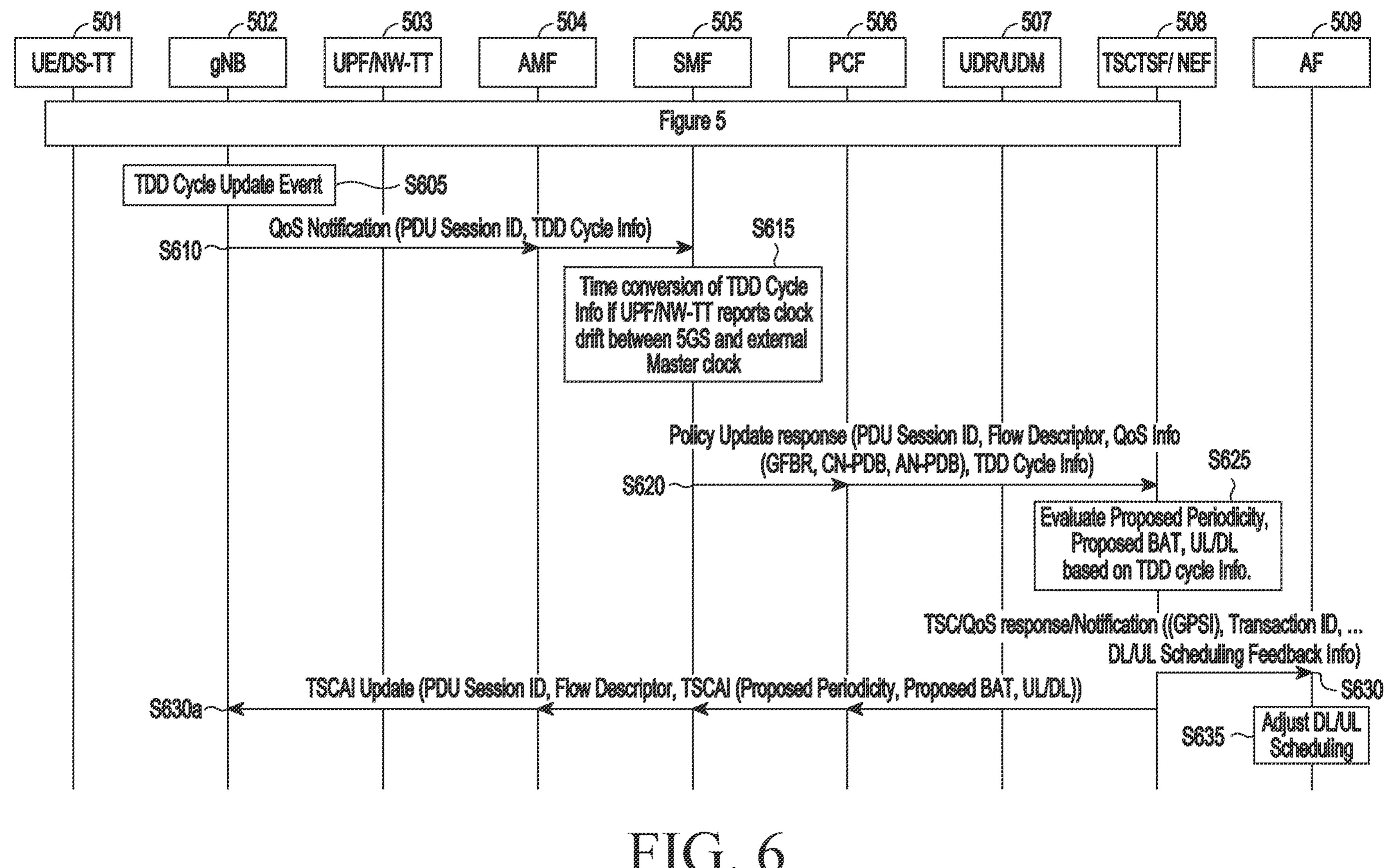
FIG. 6 illustrates a method for adjusting scheduling when a scheduling characteristic or information is changed after the operations of FIGS. 5A and 5B according to an embodiment of the disclosure.

FIG. 6 illustrates a method for adjusting scheduling when a scheduling characteristic or information is changed after the operations of FIGS. 5A and 5B according to an embodiment of the disclosure.

Referring to FIG. 6, after operation S580 is performed in operation S505 of FIGS. 5A and 5B, the NG-RAN 502 may transfer updated scheduling information (or characteristics) to the AMF 504 when it is identified that the scheduling characteristic such as the TDD cycle is reconfigured or the scheduling information such as the TDD cycle of the newly connected cell is updated by the handover of the UE operation S605.

In operation S610, the NG-RAN 502 may transmit scheduling information (or characteristics) such as updated TDD cycle information to the SMF 505 via the AMF 504. In this case, the transferred information may include PDU session ID, flow descriptor, QoS info (GFBR, CN-PDB, and AN-PDB), and TDD cycle info.

In operation S615, the SMF 505 may perform time conversion on scheduling information (or characteristics) such as a TDD cycle if necessary. The time conversion method may be a method similar to the method performed in operation S560 of FIG. 5B.

In operation S620, the SMF 505 may transfer the updated scheduling information to the TSCTSF 508 via the PCF 506. In this case, the transferred information may include PDU session ID, flow descriptor, QoS info (GFBR, CN-PDB, and AN-PDB), and TDD cycle info.

In operation S570, the TSCTSF 508 may generate or update a proposed periodicity matching the required initial periodicity and P-range conditions, and generate or update a proposed BAT matching the required initial BAT and BAT-range conditions, based on the updated scheduling information. Further, the TSCTSF 508 may identify whether the updated proposed periodicity meets the required initial periodicity and P-range conditions and whether the updated proposed BAT meets the required initial BAT and BAT-range conditions. It may be verified again whether other information in the DL/UL scheduling feedback info meets the conditions.

In operation S630, the TSCTSF 508 may send a response to the TSC/QoS request to the AF 509 directly or via the NEF. In this case, if the TSCTSF 508 has already sent a response to the TSC/QoS request in operation 520*a*, the TSCTSF 308 may transmit information to the AF 509 in the TSC/QoS notification format. In this case, the transferred message may include GPSI, transaction ID, and DL/UL scheduling feedback info. The DL/UL scheduling feedback info may include src/dst address/port, application ID, required bit rate, proposed periodicity, proposed BAT, and required latency.

In operation S630*a*, the TSCTSF 508 may send a request including the generated proposed periodicity and proposed BAT to the SMF 505 via the PCF 506. The SMF 505 may newly generate a TSCAI to include the information and transmit the TSCAI to the NG-RAN 502 through the AMF 504. The NG-RAN 502 may use the information for scheduling a corresponding flow.

In operation S635, the AF 509 may re-adjust the application scheduling based on the received information. In other words, for DL scheduling, the stream generation and transmission time of the server may be adjusted, and for UL scheduling, the stream generation and transmission time of the UE may be adjusted.

Figure 7A:
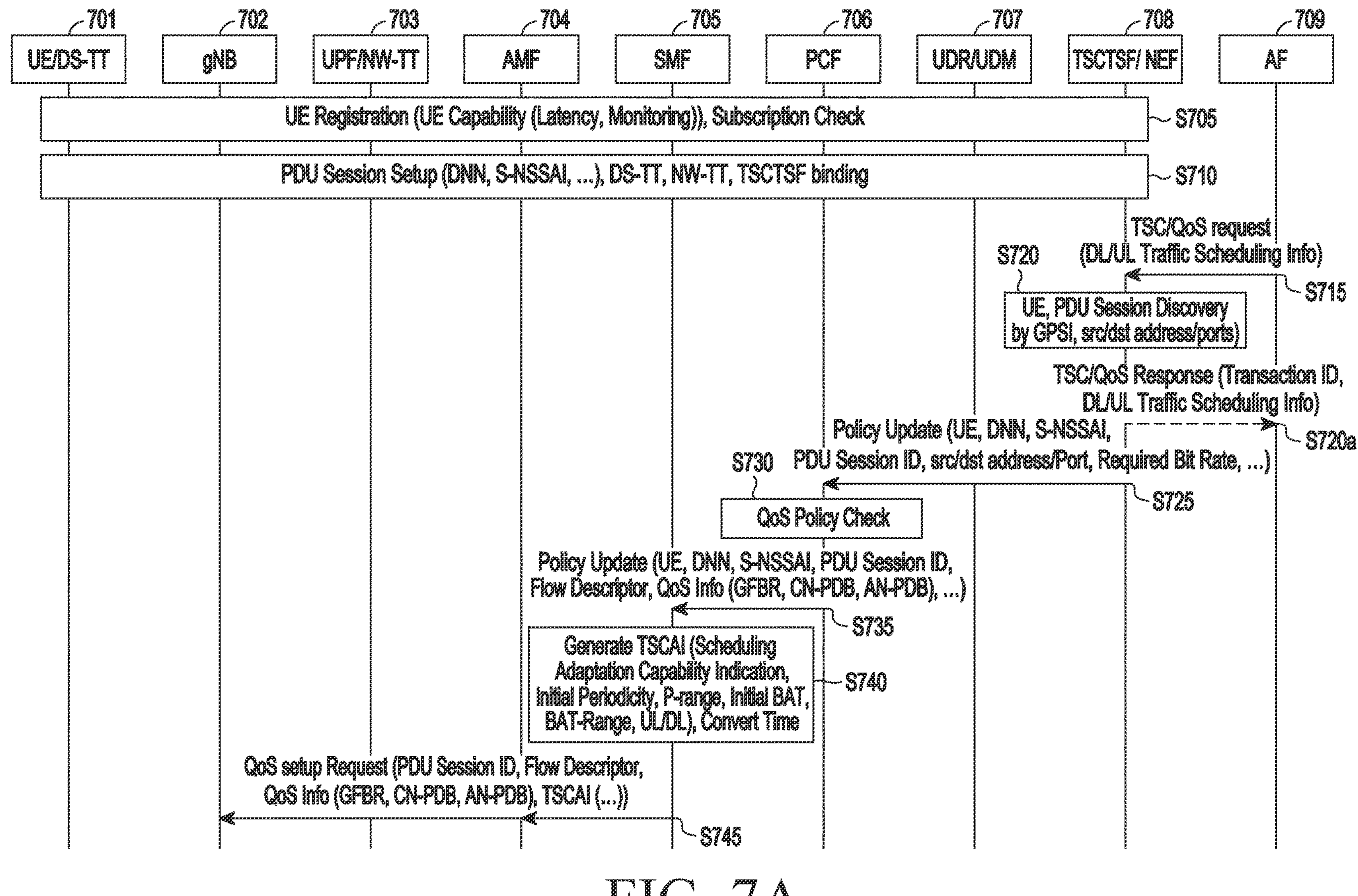
FIGS. 7A and 7B illustrate a third method for adjusting scheduling by an AF according to various embodiments of the disclosure.
Figure 7B:
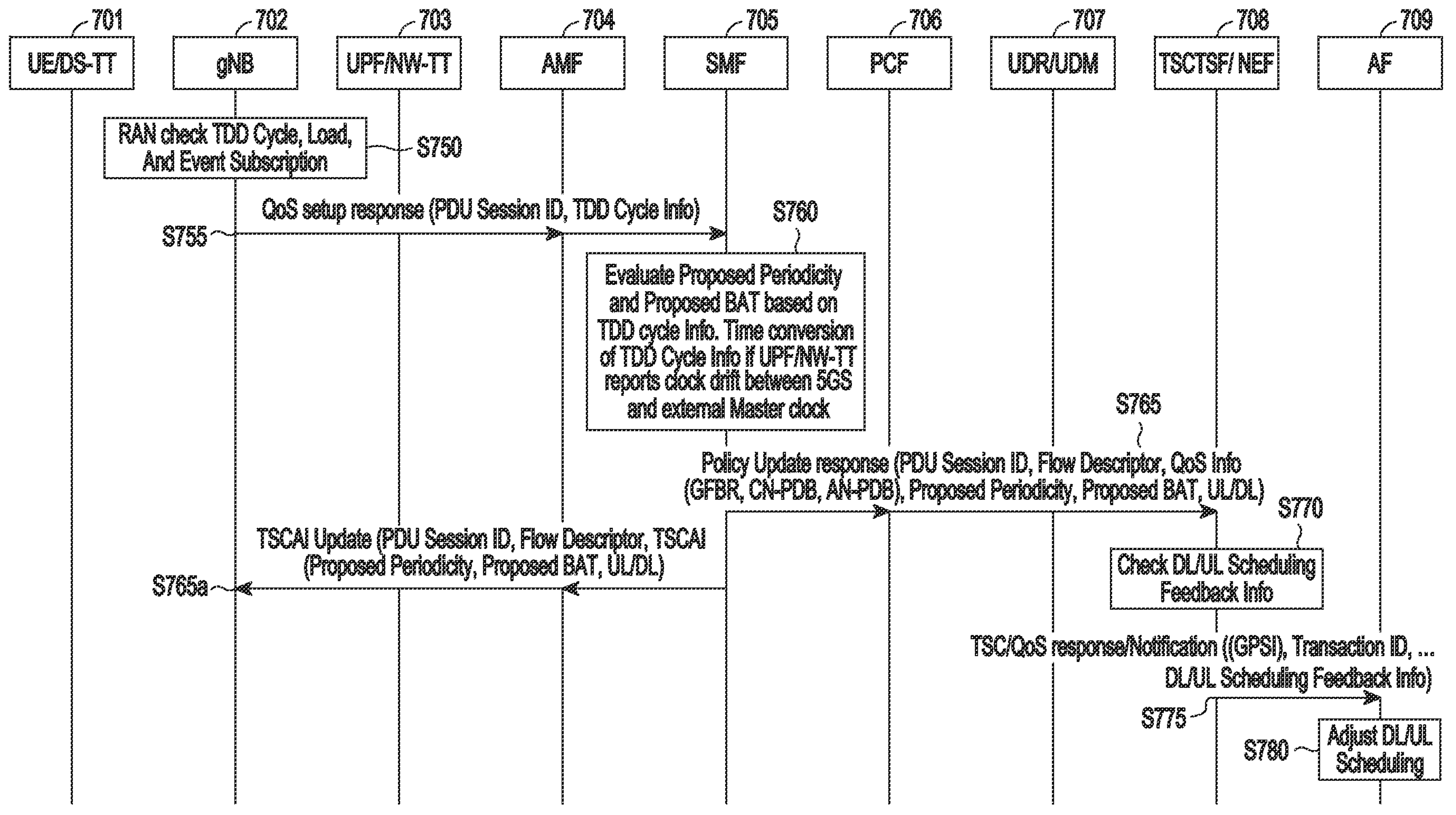

FIGS. 7A and 7B illustrate a third method for adjusting scheduling by an AF according to various embodiments of the disclosure.

Referring to FIGS. 7A and 7B, in operation S705, the UE 701 may perform registration on the 5GS. In this case, the UE 701 may be in a state of subscribing to a low-latency service and a monitoring service.

In operation S710, the UE 701 may set a PDU session. In this case, time synchronization with the external application server may be maintained through a device-side TSN translator (DS-TT) positioned in the UE 701 and a network-side TSN translator (NW-TT) positioned in the UPF 703. In this case, the master clock referred to by the external application and the master clock referred to by the 5GS may be completely the same or different. When the master clock referred to by the external application is different from the master clock referred to by the 5GS, the NW-TT may identify, and update with, the difference and transmit the same to the SMF 705. Further, when interworking with an external application function, binding with the TSCTSF 708 in charge of a function related to time synchronization may be performed.

In operation S715, the AF 709 may transfer a time-sensitive communications (TSC)/QoS request to the TSCTSF 708 directly or via the NEF 708 or via a UDR/UDM 707. The request may include traffic schedule information (e.g., DL/UL traffic scheduling info). The traffic schedule information may include at least one of GPSI, source/destination (src/dst), address/port, application ID, required bit rate, scheduling adaptation capability indication, initial periodicity, P-range, initial BAT, BAT-range, UL/DL, and required latency. The global public subscription identifier (GPSI) indicates the identifier of the UE that may be referred to outside the 5GS and may include an IP address or an Ethernet address. Scheduling adaptation capability indication indicates whether the external application may adjust scheduling. Periodicity range (P-range) indicates a range of periodicity that may be adjusted by the external application. BAT-range indicates a range of burst arrival time that may be adjusted by the external application.

In operation S720, the TSCTSF or the NEF 708 may discover the UE 701 and discover the PDU session. In this case, GPSI and src/dst address/ports may be utilized. In this case, the TSCTSF 708 may determine whether the information may be processed by referring to subscriber information.

In operation S720*a*, the TSCTSF or the NEF 708 may transfer a TSC/QoS response message to the AF 709. The response message may include a transaction ID and a DL/UL traffic scheduling info.

In operation S725, the TSCTSF 708 may transfer the information received from the AF in operation S715 to the UE discovered in operation S720 and the PCF 706 bound to the PDU session. The transfer request may include traffic schedule information, UE id, DNN, S-NSSAI, PDU session ID, src/dst address/port, required bit rate, scheduling adaptation capability indication, initial periodicity, P-range, initial BAT, BAT-range, UL/DL, and required latency.

In operation S730, the PCF 706 may determine whether the QoS-related requirement may be met and determine whether the QoS-related requirement may be processed. A guaranteed flow bit rate (GFBR) capable of achieving the required bit rate, a core network packet delay budget (CN-PDB) capable of achieving the required bit rate, and an access network packet delay budget (AN-PDB) may be mapped to QoS Info.

In operation S735, the PCF 706 may transfer the information identified in operation S730 to the SMF 705. The information may include at least one of UE id, DNN, S-NSSAI, PDU session ID, flow descriptor, QoS info (GFBR, CN-PDB, AN-PDB), scheduling adaptation capability indication, initial periodicity, P-range, initial BAT, BAT-range, and UL/DL received from the TSCTSF 708. The flow descriptor may include src/dst address/port and application ID.

In operation S740, the SMF 705 may generate time synchronization assistance information (e.g., TSC assistance information (TSCAI)). In this case, when the master clock referred to by the external application is different from the master clock referred to by the 5GS, the NW-TT 703 may identify, and update with, the difference and transmit the same to the SMF 705. The SMF 705 may change the information specified based on the external time to the 5GS time by reflecting the received difference information. In this case, the TSCAI may include scheduling adaptation capability indication, initial periodicity, P-range, initial BAT, BAT-range, and UL/DL.

In operation S745, the SMF 705 may transfer the generated and converted information to the AMF 704 through a request message (e.g., a QoS setup request message), and the AMF 704 may transfer the information to the NG-RAN 702. The transferred information may include at least one of PDU session ID, flow descriptor, QoS info (GFBR, CN-PDB, AN-PDB), and TSCAI (scheduling adaptation capability indication, initial periodicity, P-range, initial BAT, BAT-range, and UL/DL).

In operation S750, the NG-RAN 702 may identify scheduling characteristic information such as TDD cycle, and identify that the external application may adjust scheduling based on the received scheduling adaptation capability indication. Or, the NG-RAN 702 may identify that the external application may adjust scheduling by identifying whether the received information includes P-range or BAT-range. The NG-RAN 702 may transmit only scheduling characteristics such as TDD cycle information to the AMF 704. Further, when the scheduling information is updated due to a scheduling characteristic such as a TDD cycle being configured, or scheduling information such as a TDD cycle of a newly connected cell being updated due to a handover of the UE, the NG-RAN 702 may determine the updated proposed periodicity and the proposed BAT and may perform subscription so as to transfer the updated scheduling information to the SMF 705.

In operation S755, the NG-RAN 702 may transmit a scheduling characteristic such as TDD cycle information to the SMF 705 via the AMF 704. The AMF 704 may transmit information received from the NG-RAN 702 to the SMF 705 as a response message (e.g., a QoS setup response message). In this case, the response message may include PDU session ID, flow descriptor, QoS info (GFBR, CN-PDB, and AN-PDB), and TDD cycle info.

In operation S760, the SMF 705 may generate a proposed periodicity matching the required initial periodicity and P-range conditions, and generate a proposed BAT matching the required initial BAT and BAT-range conditions by referring to the received scheduling information such as TDD cycle. The SMF 705 may perform a necessary modification task, such as conversion between the master times referred to between the external application and the 5GS system, on the information received from the AMF 704. In other words, the SMF 705 may perform time conversion on the proposed periodicity and the proposed BAT as needed.

In operation S765, the SMF 705 may transfer the converted information to the TSCTSF 708 via the PCF 706. In this case, the transferred message may include PDU session ID, flow descriptor, QoS info (GFBR, CN-PDB, and AN-PDB), proposed periodicity, proposed BAT, and UL/DL.

In operation S765*a*, the SMF 705 may generate the TSCAI to include the generated proposed periodicity and the proposed BAT and may transfer the TSCAI to the NG-RAN 702 via the AMF 704. The NG-RAN 702 may use the information for scheduling a corresponding flow.

In operation S770, the TSCTSF 708 may identify whether the received proposed periodicity meets the required initial periodicity and P-range conditions and whether the proposed BAT meets the required initial BAT and BAT-range conditions. It may be verified again whether other information in the DL/UL scheduling feedback info meets the conditions.

In operation S775, the TSCTSF 708 may transmit a response to the TSC/QoS request received in operation S715 to the AF 709 directly or via the NEF. In this case, if the TSCTSF 708 has already sent a response to the TSC/QoS request in operation 720*a*, the TSCTSF 308 may transmit information to the AF 709 in the TSC/QoS notification format. The message transmitted to the AF 709 may include GPSI, transaction ID, and DL/UL scheduling feedback info. The DL/UL scheduling feedback info may include src/dst address/port, application ID, required bit rate, proposed periodicity, proposed BAT, and required latency.

In operation S780, the AF 709 may adjust application scheduling based on the information received from the TSCTSF 708. In other words, for DL scheduling, the stream generation and transmission time of the server may be adjusted, and for UL scheduling, the stream generation and transmission time of the UE may be adjusted.

Figure 8:
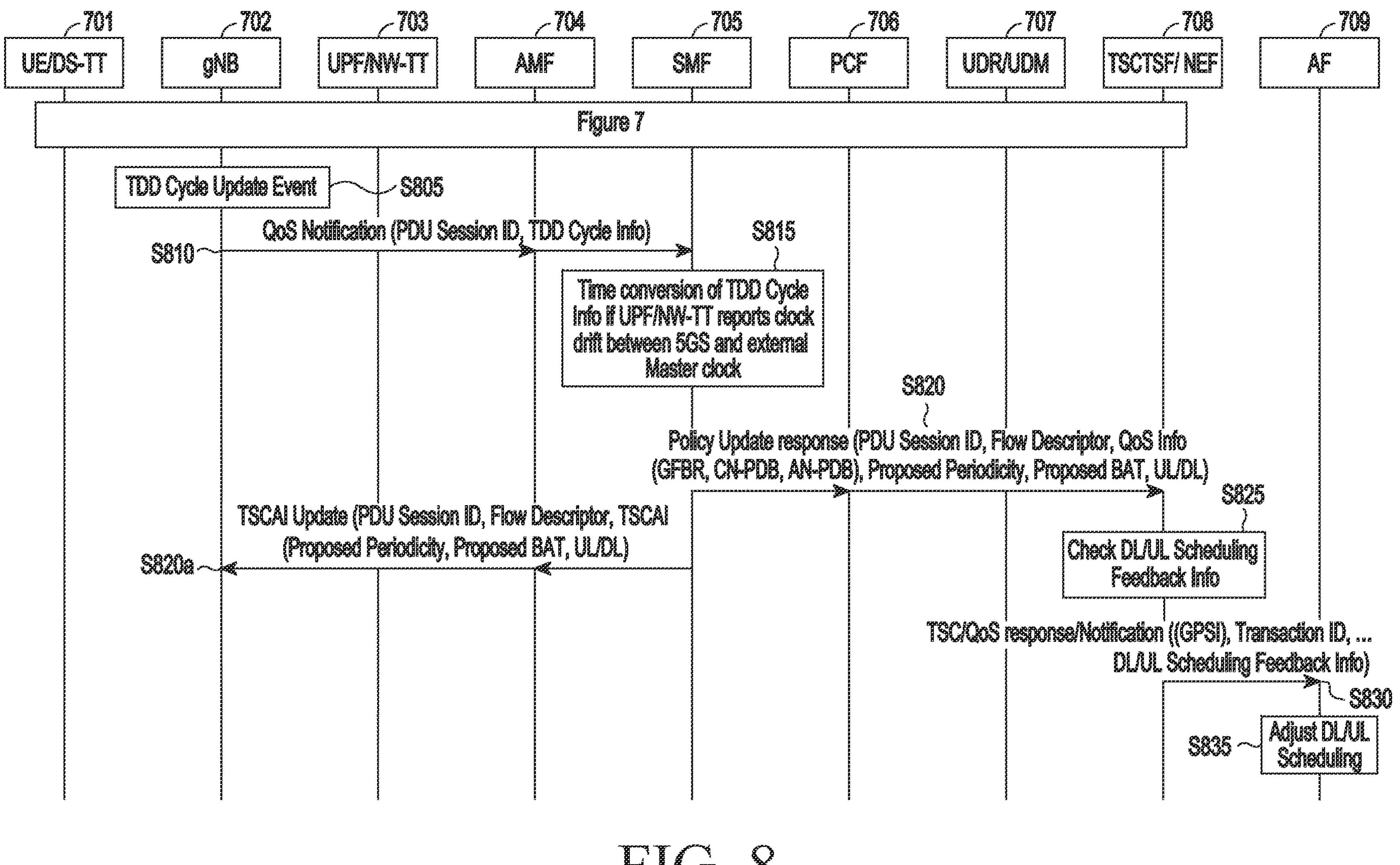
FIG. 8 illustrates a method for adjusting scheduling when a scheduling characteristic or information is changed after the operations of FIGS. 7A and 7B according to an embodiment of the disclosure.

FIG. 8 illustrates a method for adjusting scheduling when a scheduling characteristic or information is changed after the operations of FIGS. 7A and 7B according to an embodiment of the disclosure.

Referring to FIG. 8, after operation S780 is performed in operation S705 of FIGS. 7A and 7B, the NG-RAN 702 may transfer updated scheduling information (or characteristics) to the AMF 704 when it is identified that the scheduling characteristic such as the TDD cycle is reconfigured or the scheduling information such as the TDD cycle of the newly connected cell is updated by the handover of the UE operation S805.

In operation S810, the NG-RAN 702 may transmit scheduling information (or characteristics) such as updated TDD cycle information to the SMF 705 via the AMF 704. In this case, the transferred information may include PDU session ID, flow descriptor, QoS info (GFBR, CN-PDB, and AN-PDB), and TDD cycle info.

In operation S815, the SMF 705 may generate or update a proposed periodicity matching the required initial periodicity and P-range conditions, and generate or update a proposed BAT matching the required initial BAT and BAT-range conditions, based on the updated scheduling information (or characteristics). Further, the SMF 705 may perform time conversion on the updated proposed periodicity and the proposed BAT as needed.

In operation S820, the SMF 705 may transfer the updated proposed periodicity and proposed BAT to the TSCTSF 708 via the PCF 706. In this case, the transferred information may include PDU session ID, flow descriptor, QoS info (GFBR, CN-PDB, and AN-PDB), updated proposed periodicity, updated proposed BAT, and UL/DL.

In operation S820*a*, the SMF 705 may generate the TSCAI to include the updated proposed periodicity and the updated proposed BAT and may transfer the TSCAI to the NG-RAN 702 via the AMF 704. The NG-RAN 702 may use the information for scheduling a corresponding flow.

In operation S825, the TSCTSF 708 may identify whether the updated proposed periodicity meets the required initial periodicity and P-range conditions and whether the updated proposed BAT meets the required initial BAT and BAT-range conditions. It may be verified again whether other information in the DL/UL scheduling feedback info meets the conditions.

In operation S830, the TSCTSF 708 may send a response to the TSC/QoS request to the AF 709 directly or via the NEF. In this case, if the TSCTSF 708 has already sent a response to the TSC/QoS request in operation 720*a*, the TSCTSF 308 may transmit information to the AF 709 in the TSC/QoS notification format. In this case, the transferred message may include GPSI, transaction ID, and DL/UL scheduling feedback info. The DL/UL scheduling feedback info may include src/dst address/port, application ID, required bit rate, proposed periodicity, proposed BAT, and required latency.

In operation S835, the AF 709 may re-adjust the application scheduling based on the received information. In other words, for DL scheduling, the stream generation and transmission time of the server may be adjusted, and for UL scheduling, the stream generation and transmission time of the UE may be adjusted.

Figure 9A:
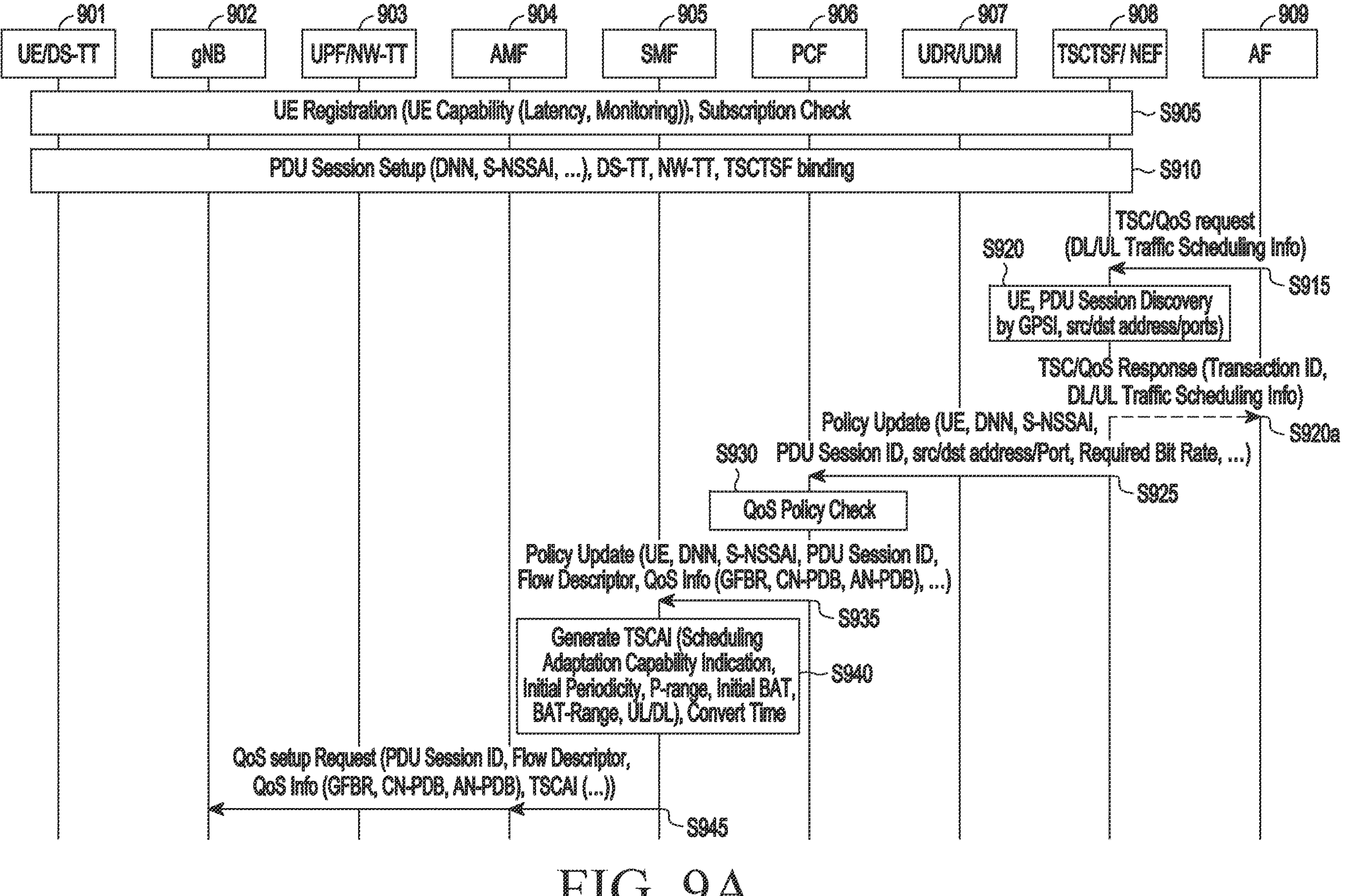
FIGS. 9A and 9B illustrate a fourth method for adjusting scheduling by an AF according to various embodiments of the disclosure.
Figure 9B:
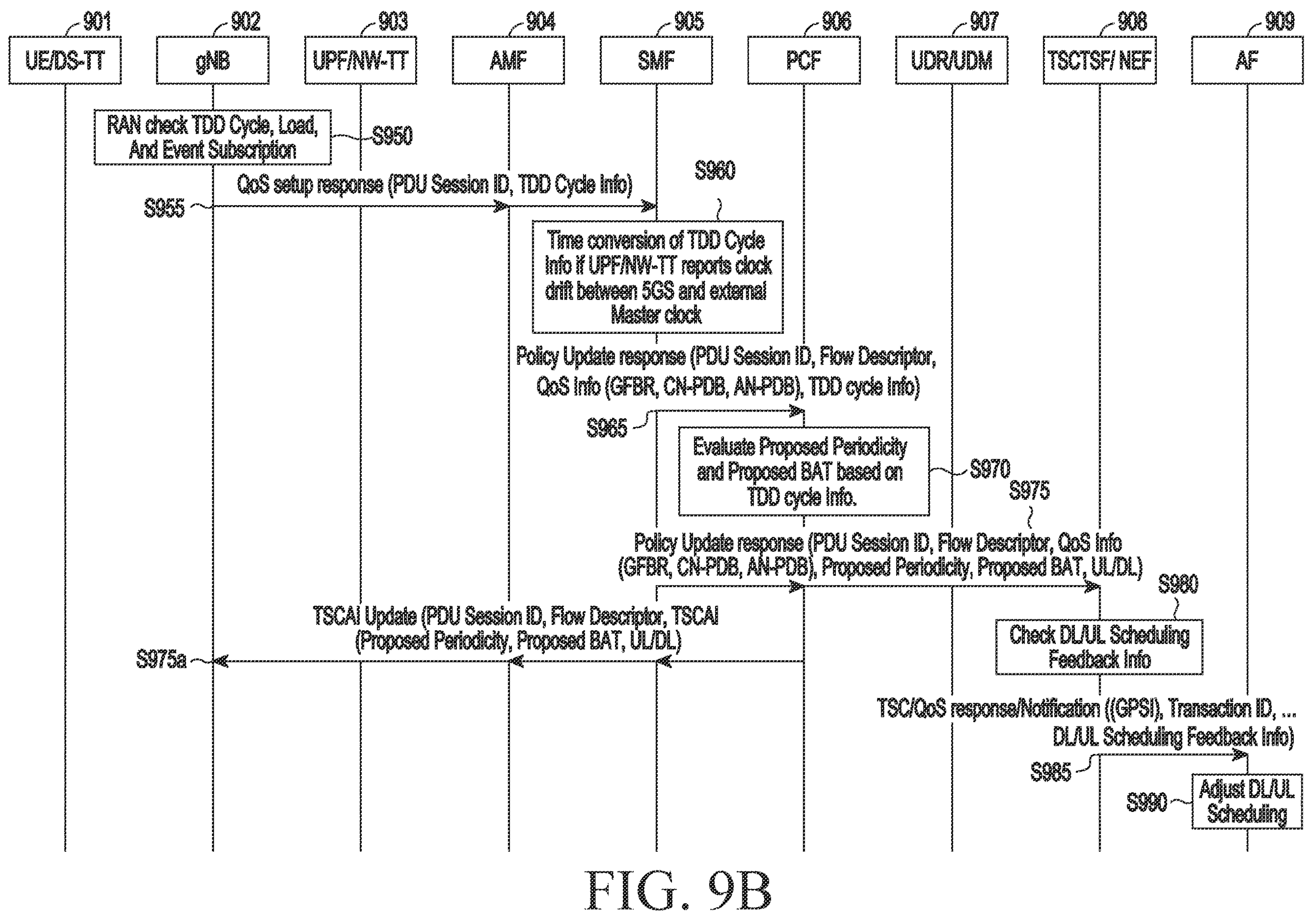

FIGS. 9A and 9B illustrate a fourth method for adjusting scheduling by an AF according to various embodiments of the disclosure.

Referring to FIGS. 9A and 9B, in operation S905, the UE 901 may perform registration on the 5GS. In this case, the UE 901 may be in a state of subscribing to a low-latency service and a monitoring service.

In operation S910, the UE 901 may set a PDU session. In this case, time synchronization with the external application server may be maintained through a device-side TSN translator (DS-TT) positioned in the UE 901 and a network-side TSN translator (NW-TT) positioned in the UPF 903. In this case, the master clock referred to by the external application and the master clock referred to by the 5GS may be completely the same or different. When the master clock referred to by the external application is different from the master clock referred to by the 5GS, the NW-TT may identify, and update with, the difference and transmit the same to the SMF 905. Further, when interworking with an external application function, binding with the TSCTSF 908 in charge of a function related to time synchronization may be performed.

In operation S915, the AF 909 may transfer a time-sensitive communications (TSC)/QoS request to the TSCTSF 908 directly or via the NEF 908 or via a UDR/UDM 907. The request may include traffic schedule information (e.g., DL/UL traffic scheduling info). The traffic schedule information may include at least one of GPSI, source/destination (src/dst), address/port, application ID, required bit rate, scheduling adaptation capability indication, initial periodicity, P-range, initial BAT, BAT-range, UL/DL, and required latency. The global public subscription identifier (GPSI) indicates the identifier of the UE that may be referred to outside the 5GS and may include an IP address or an Ethernet address. Scheduling adaptation capability indication indicates whether the external application may adjust scheduling. Periodicity range (P-range) indicates a range of periodicity that may be adjusted by the external application. BAT-range indicates a range of burst arrival time that may be adjusted by the external application.

In operation S920, the TSCTSF or the NEF 908 may discover the UE 901 and discover the PDU session. In this case, GPSI and src/dst address/ports may be utilized. In this case, the TSCTSF 908 may determine whether the information may be processed by referring to subscriber information.

In operation S920*a*, the TSCTSF or the NEF 908 may transfer a TSC/QoS response message to the AF 909. The response message may include a transaction ID and a DL/UL traffic scheduling info.

In operation S925, the TSCTSF 908 may transfer the information received from the AF in operation S915 to the UE discovered in operation S920 and the PCF 906 bound to the PDU session. The transfer request may include traffic schedule information, UE id, DNN, S-NSSAI, PDU session ID, src/dst address/port, required bit rate, scheduling adaptation capability indication, initial periodicity, P-range, initial BAT, BAT-range, UL/DL, and required latency.

In operation S930, the PCF 906 may determine whether the QoS-related requirement may be met and determine whether the QoS-related requirement may be processed. A guaranteed flow bit rate (GFBR) capable of achieving the required bit rate, a core network packet delay budget (CN-PDB) capable of achieving the required bit rate, and an access network packet delay budget (AN-PDB) may be mapped to QoS Info.

In operation S935, the PCF 906 may transfer the information identified in operation S930 to the SMF 905. The information may include at least one of UE id, DNN, S-NSSAI, PDU session ID, flow descriptor, QoS info (GFBR, CN-PDB, AN-PDB), scheduling adaptation capability indication, initial periodicity, P-range, initial BAT, BAT-range, and UL/DL received from the TSCTSF 908. The flow descriptor may include src/dst address/port and application ID.

In operation S940, the SMF 905 may generate time synchronization assistance information (e.g., TSC assistance information (TSCAI)). In this case, when the master clock referred to by the external application is different from the master clock referred to by the 5GS, the NW-TT 903 may identify, and update with, the difference and transmit the same to the SMF 905. The SMF 905 may change the information specified based on the external time to the 5GS time by reflecting the received difference information. In this case, the TSCAI may include scheduling adaptation capability indication, initial periodicity, P-range, initial BAT, BAT-range, and UL/DL.

In operation S945, the SMF 905 may transfer the generated and converted information to the AMF 904 through a request message (e.g., a QoS setup request message), and the AMF 904 may transfer the information to the NG-RAN 902. The transferred information may include at least one of PDU session ID, flow descriptor, QoS info (GFBR, CN-PDB, AN-PDB), and TSCAI (scheduling adaptation capability indication, initial periodicity, P-range, initial BAT, BAT-range, and UL/DL).

In operation S950, the NG-RAN 902 may identify scheduling characteristic information such as TDD cycle, and identify that the external application may adjust scheduling based on the received scheduling adaptation capability indication. Or, the NG-RAN 902 may identify that the external application may adjust scheduling by identifying whether the received information includes P-range or BAT-range. The NG-RAN 902 may transmit only scheduling characteristics such as TDD cycle information to the AMF 904. Further, when the scheduling information is updated due to a scheduling characteristic such as a TDD cycle being configured, or scheduling information such as a TDD cycle of a newly connected cell being updated due to a handover of the UE, the NG-RAN 902 may determine the updated proposed periodicity and the proposed BAT and may perform subscription so as to transfer the updated scheduling information to the SMF 905.

In operation S955, the NG-RAN 902 may transmit a scheduling characteristic such as TDD cycle information to the SMF 905 via the AMF 904. The AMF 904 may transmit information received from the NG-RAN 902 to the SMF 905 as a response message (e.g., a QoS setup response message). In this case, the response message may include PDU session ID, flow descriptor, QoS info (GFBR, CN-PDB, and AN-PDB), and TDD cycle info.

In operation S960, the SMF 905 may perform a necessary modification task, such as conversion between the master times referred to between the external application and the 5GS system, on the information received from the AMF 904.

In operation S965, the SMF 905 may transfer the updated information to the PCF 906.

In operation S970, the PCF 906 may generate a proposed periodicity by referring to scheduling information such as the TDD cycle and considering the initial periodicity and the P-range. Further, the PCF 906 may generate a proposed BAT by referring to scheduling information such as the TDD Cycle and considering the initial BAT and the P-BAT.

In operation S975, the PCF 906 may transfer the information to the TSCTSF 908. In this case, the transferred information may include PDU session ID, flow descriptor, QoS info (GFBR, CN-PDB, and AN-PDB), proposed periodicity, proposed BAT, and UL/DL.

In operation S975*a*, the PCF 906 may transfer the proposed periodicity and the proposed BAT to the SMF 905, and the SMF 905 may generate the TSCAI to include the proposed periodicity and the proposed BAT and may transfer the TSCAI to the NG-RAN 902 via the AMF 904. The NG-RAN 902 may use the information for scheduling a corresponding flow.

In operation S980, the TSCTSF 908 may identify whether the received proposed periodicity meets the required initial periodicity and P-range conditions and whether the proposed BAT meets the required initial BAT and BAT-range conditions. It may be verified again whether other information in the DL/UL scheduling feedback info meets the conditions.

In operation S985, the TSCTSF 908 may transmit a response to the TSC/QoS request received in operation S915 to the AF 909 directly or via the NEF. In this case, if the TSCTSF 908 has already sent a response to the TSC/QoS request in operation 920*a*, the TSCTSF 308 may transmit information to the AF 909 in the TSC/QoS notification format. The message transmitted to the AF 909 may include GPSI, transaction ID, and DL/UL scheduling feedback info. The DL/UL scheduling feedback info may include src/dst address/port, application ID, required bit rate, proposed periodicity, proposed BAT, and required latency.

In operation S990, the AF 909 may adjust application scheduling based on the information received from the TSCTSF 908. In other words, for DL scheduling, the stream generation and transmission time of the server may be adjusted, and for UL scheduling, the stream generation and transmission time of the UE may be adjusted.

Figure 10:
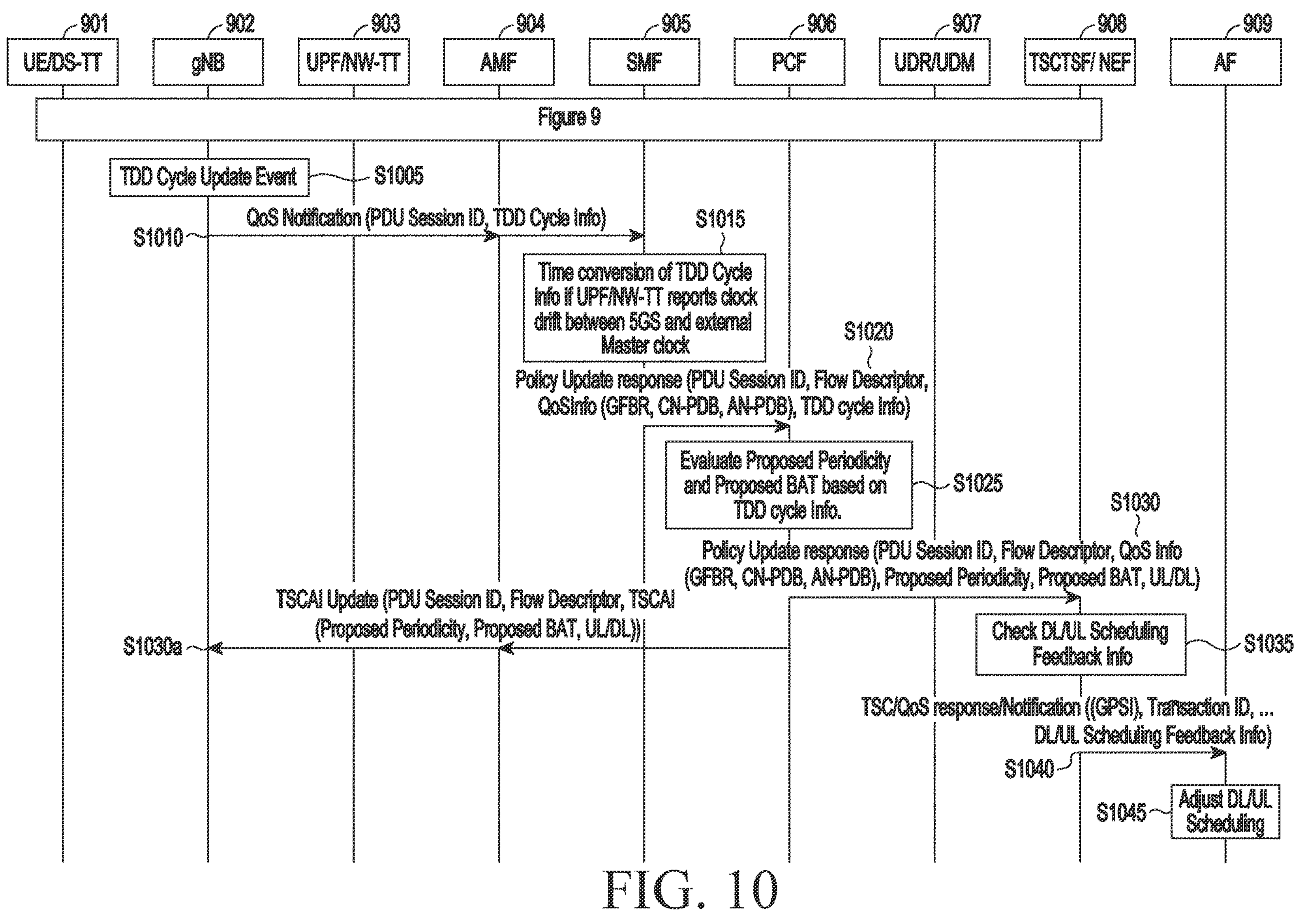
FIG. 10 illustrates a method for adjusting scheduling when a scheduling characteristic or information is changed after the operations of FIGS. 9A and 9B according to an embodiment of the disclosure.

FIG. 10 illustrates a method for adjusting scheduling when a scheduling characteristic or information is changed after the operations of FIGS. 9A and 9B according to an embodiment of the disclosure.

Referring to FIG. 10, after operation S990 is performed in operation S905 of FIGS. 9A and 9B, the NG-RAN 902 may transfer updated scheduling information (or characteristics) to the AMF 904 when it is identified that the scheduling characteristic such as the TDD cycle is reconfigured or the scheduling information such as the TDD cycle of the newly connected cell is updated by the handover of the UE operation S1005.

In operation S1010, the NG-RAN 902 may transmit scheduling information (or characteristics) such as updated TDD cycle information to the SMF 905 via the AMF 904. In this case, the transferred information may include PDU session ID, flow descriptor, QoS info (GFBR, CN-PDB, and AN-PDB), and TDD cycle info.

In operation S1015, the SMF 905 may perform a necessary modification task, such as conversion between the master times referred to between the external application and the 5GS system, on the information received from the AMF 904. In other words, the SMF 905 may perform time conversion on scheduling information such as a TDD cycle if necessary.

In operation S1020, the SMF 905 may transfer the updated scheduling information to the PCF 906.

In operation S1025, the PCF 906 may generate or update a proposed periodicity matching the required initial periodicity and P-range conditions, and generate or update a proposed BAT matching the required initial BAT and BAT-range conditions.

In operation S1030, the PCF 906 may transfer the updated proposed periodicity and proposed BAT to the TSCTSF 908. In this case, the transferred information may include PDU session ID, flow descriptor, QoS info (GFBR, CN-PDB, and AN-PDB), proposed periodicity, proposed BAT, and UL/DL.

In operation S1030*a*, the PCF 906 may transfer the updated proposed periodicity and proposed BAT to the SMF 905, and the SMF 905 may generate the TSCAI to include the proposed periodicity and the proposed BAT and may transfer the TSCAI to the NG-RAN 902 via the AMF 904. The NG-RAN 902 may use the received information for scheduling a corresponding flow.

In operation S1035, the TSCTSF 908 may identify whether the updated proposed periodicity meets the required initial periodicity and P-range conditions and whether the updated proposed BAT meets the required initial BAT and BAT-range conditions. It may be verified again whether other information in the DL/UL scheduling feedback info meets the conditions.

In operation S1040, the TSCTSF 908 may send a response to the TSC/QoS request to the AF 909 directly or via the NEF. In this case, if the TSCTSF 908 has already sent a response to the TSC/QoS request in operation 920*a*, the TSCTSF 308 may transmit information to the AF 909 in the TSC/QoS notification format. In this case, the transferred message may include GPSI, transaction ID, and DL/UL scheduling feedback info. The DL/UL scheduling feedback info may include src/dst address/port, application ID, required bit rate, proposed periodicity, proposed BAT, and required latency.

In operation S1045, the AF 909 may re-adjust the application scheduling based on the received information. In other words, for DL scheduling, the stream generation and transmission time of the server may be adjusted, and for UL scheduling, the stream generation and transmission time of the UE may be adjusted.

Figure 11A:
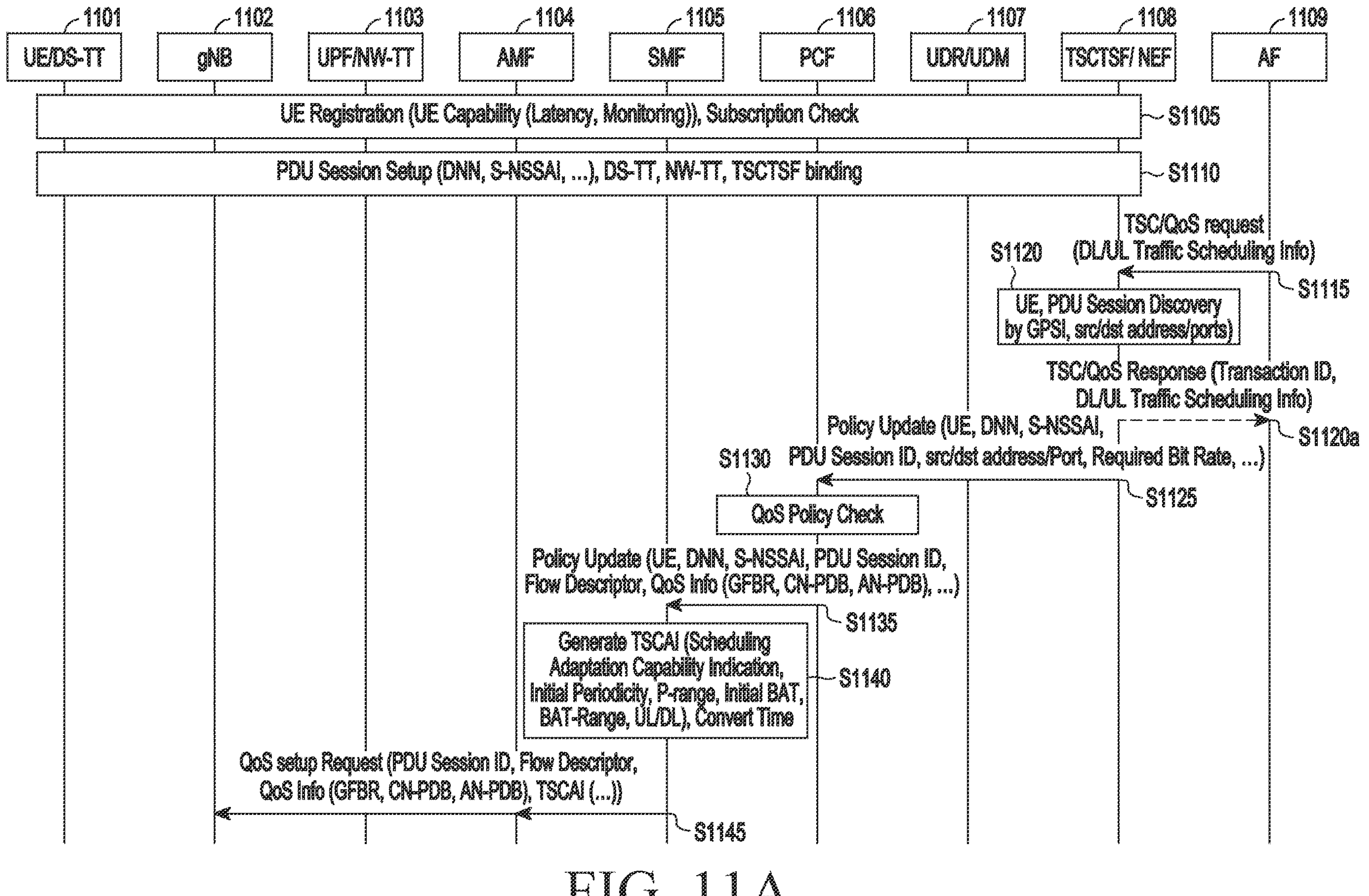
FIGS. 11A and 11B illustrate a fifth method for adjusting scheduling by an AF according to various embodiments of the disclosure.
Figure 11B:
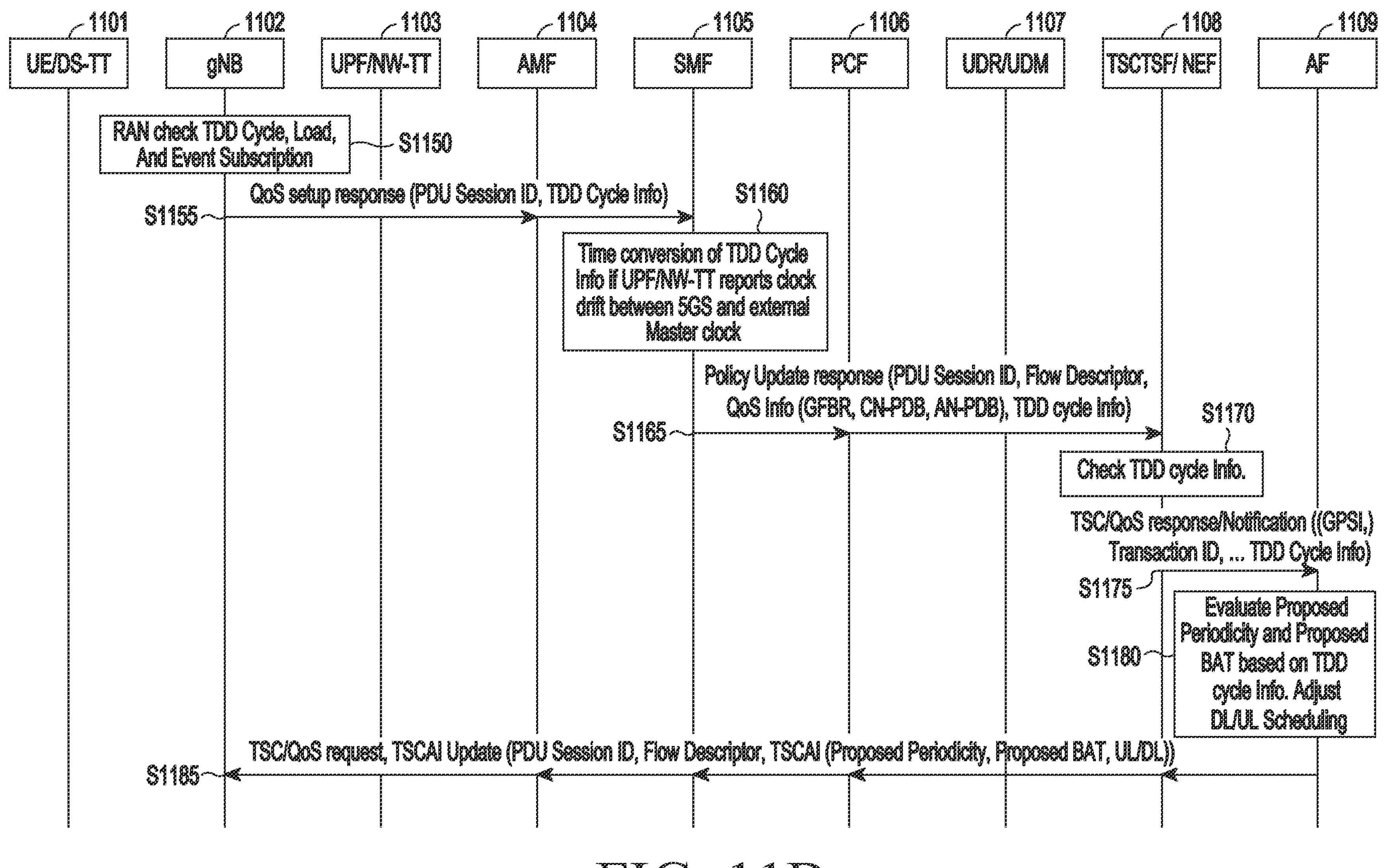

FIGS. 11A and 11B illustrate a fifth method for adjusting scheduling by an AF according to various embodiments of the disclosure.

Referring to FIGS. 11A and 11B, in operation S1105, the UE 1101 may perform registration on the 5GS. In this case, the UE 1101 may be in a state of subscribing to a low-latency service and a monitoring service.

In operation S1110, the UE 1101 may set a PDU session. In this case, time synchronization with the external application server may be maintained through a device-side TSN translator (DS-TT) positioned in the UE 1101 and a network-side TSN translator (NW-TT) positioned in the UPF 1103. In this case, the master clock referred to by the external application and the master clock referred to by the 5GS may be completely the same or different. When the master clock referred to by the external application is different from the master clock referred to by the 5GS, the NW-TT may identify, and update with, the difference and transmit the same to the SMF 1105. Further, when interworking with an external application function, binding with the TSCTSF 1108 in charge of a function related to time synchronization may be performed.

In operation S1115, the AF 1109 may transfer a time-sensitive communications (TSC)/QoS request to the TSCTSF 1108 directly or via the NEF 1108 or via a UDR/UDM 1107. The request may include traffic schedule information (e.g., DL/UL traffic scheduling info). The traffic schedule information may include at least one of GPSI, source/destination (src/dst), address/port, application ID, required bit rate, scheduling adaptation capability indication, initial periodicity, P-range, initial BAT, BAT-range, UL/DL, and required latency. The global public subscription identifier (GPSI) indicates the identifier of the UE that may be referred to outside the 5GS and may include an IP address or an Ethernet address. Scheduling adaptation capability indication indicates whether the external application may adjust scheduling. Periodicity range (P-range) indicates a range of periodicity that may be adjusted by the external application. BAT-range indicates a range of burst arrival time that may be adjusted by the external application.

In operation S1120, the TSCTSF or the NEF 1108 may discover the UE 1101 and discover the PDU session. In this case, GPSI and src/dst address/ports may be utilized. In this case, the TSCTSF 1108 may determine whether the information may be processed by referring to subscriber information.

In operation S1120*a*, the TSCTSF or the NEF 1108 may transfer a TSC/QoS response message to the AF 1109. The response message may include a transaction ID and a DL/UL traffic scheduling info.

In operation S1125, the TSCTSF 1108 may transfer the information received from the AF in operation S1115 to the UE discovered in operation S1120 and the PCF 1106 bound to the PDU session. The transfer request may include traffic schedule information, UE id, DNN, S-NSSAI, PDU session ID, src/dst address/port, required bit rate, scheduling adaptation capability indication, initial periodicity, P-range, initial BAT, BAT-range, UL/DL, and required latency.

In operation S1130, the PCF 1106 may determine whether the QoS-related requirement may be met and determine whether the QoS-related requirement may be processed. A guaranteed flow bit rate (GFBR) capable of achieving the required bit rate, a core network packet delay budget (CN-PDB) capable of achieving the required bit rate, and an access network packet delay budget (AN-PDB) may be mapped to QoS Info.

In operation S1135, the PCF 1106 may transfer the information identified in operation S1130 to the SMF 1105. The information may include at least one of UE id, DNN, S-NSSAI, PDU session ID, flow descriptor, QoS info (GFBR, CN-PDB, AN-PDB), scheduling adaptation capability indication, initial periodicity, P-range, initial BAT, BAT-range, and UL/DL received from the TSCTSF 1108. The flow descriptor may include src/dst address/port and application ID.

In operation S1140, the SMF 1105 may generate time synchronization assistance information (e.g., TSC assistance information (TSCAI)). In this case, when the master clock referred to by the external application is different from the master clock referred to by the 5GS, the NW-TT 1103 may identify, and update with, the difference and transmit the same to the SMF 1105. The SMF 1105 may change the information specified based on the external time to the 5GS time by reflecting the received difference information. In this case, the TSCAI may include scheduling adaptation capability indication, initial periodicity, P-range, initial BAT, BAT-range, and UL/DL.

In operation S1145, the SMF 1105 may transfer the generated and converted information to the AMF 1104 through a request message (e.g., a QoS setup request message), and the AMF 1104 may transfer the information to the NG-RAN 1102. The transferred information may include at least one of PDU session ID, flow descriptor, QoS info (GFBR, CN-PDB, AN-PDB), and TSCAI (scheduling adaptation capability indication, initial periodicity, P-range, initial BAT, BAT-range, and UL/DL).

In operation S1150, the NG-RAN 1102 may identify scheduling characteristic information such as TDD cycle, and identify that the external application may adjust scheduling based on the received scheduling adaptation capability indication. Or, the NG-RAN 1102 may identify that the external application may adjust scheduling by identifying whether the received information includes P-range or BAT-range. The NG-RAN 1102 may transmit only scheduling characteristics such as TDD cycle information to the AMF 1104. Further, when the scheduling information is updated due to a scheduling characteristic such as a TDD cycle being configured, or scheduling information such as a TDD cycle of a newly connected cell being updated due to a handover of the UE, the NG-RAN 1102 may determine the updated proposed periodicity and the proposed BAT and may perform subscription so as to transfer the updated scheduling information to the SMF 1105.

In operation S1155, the NG-RAN 1102 may transmit a scheduling characteristic such as TDD cycle information to the SMF 1105 via the AMF 1104. The AMF 1104 may transmit information received from the NG-RAN 1102 to the SMF 1105 as a response message (e.g., a QoS setup response message). In this case, the response message may include PDU session ID, flow descriptor, QoS info (GFBR, CN-PDB, and AN-PDB), and TDD cycle info.

In operation S1160, the SMF 1105 may perform time conversion on scheduling information such as a TDD cycle if necessary.

In operation S1165, the SMF 1105 may transfer the updated information to the TSCTSF 1108 via the PCF 1106. In this case, the transferred information may include PDU session ID, flow descriptor, QoS info (GFBR, CN-PDB, and AN-PDB), and TDD cycle info.

In operation S1170, the TSCTSF 1108 may identify the received TDD cycle info.

In operation S1175, the TSCTSF 1108 may transmit a response to the TSC/QoS request received in operation S1115 to the AF 1109 directly or via the NEF. In this case, if the TSCTSF 1108 has already sent a response to the TSC/QoS request in operation 1120*a*, the TSCTSF 308 may transmit information to the AF 909 in the TSC/QoS notification format. The message transmitted to the AF 1109 may include GPSI, transaction ID, and DL/UL scheduling feedback info. The DL/UL scheduling feedback info may include src/dst address/port, application ID, required bit rate, proposed periodicity, proposed BAT, and required latency.

In operation S1180, the AF 1109 may generate a proposed periodicity based on the received scheduling information such as the TDD cycle and considering the initial periodicity and the P-range. Further, the AF 1109 may generate a proposed BAT based on the received scheduling information such as the TDD cycle and considering the initial BAT and the BAT-range. Thereafter, the AF 1109 may adjust application scheduling based on the generated information. In other words, for DL scheduling, the stream generation and transmission time of the server may be adjusted, and for UL scheduling, the stream generation and transmission time of the UE may be adjusted.

In operation S1185, the AF 1109 may update the TSCAI up to the NG-RAN 1102 by using the procedure of operation S1115 to operation S1145 to include the generated proposed periodicity and proposed BAT.

Figure 12:
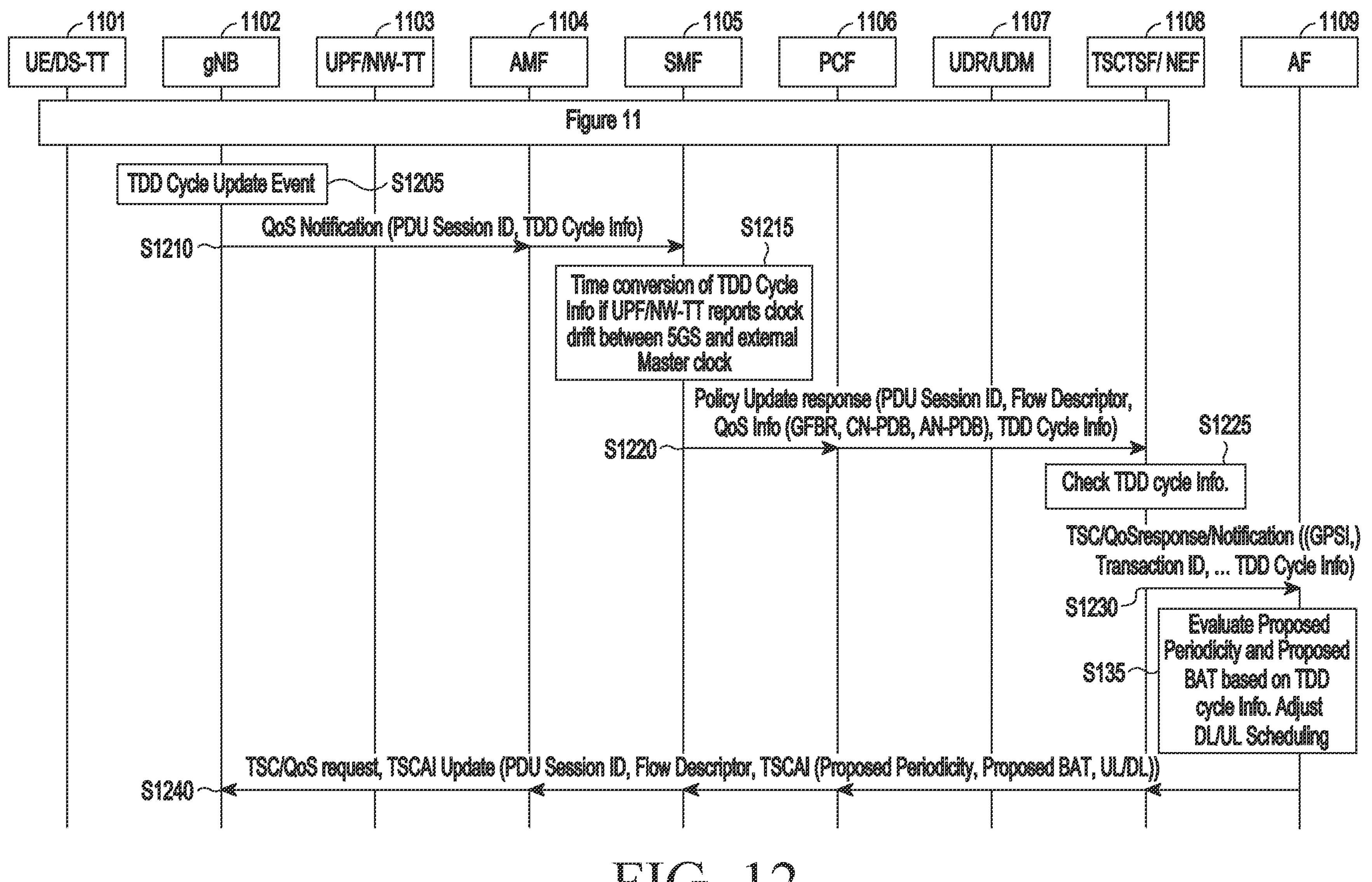
FIG. 12 illustrates a method for adjusting scheduling when a scheduling characteristic or information is changed after the operations of FIGS. 11A and 11B according to an embodiment of the disclosure.

FIG. 12 illustrates a method for adjusting scheduling when a scheduling characteristic or information is changed after the operations of FIGS. 11A and 11B according to an embodiment of the disclosure.

Referring to FIG. 12, after operation S1185 is performed in operation S1105 of FIGS. 11A and 11B, the NG-RAN 1102 may transfer updated scheduling information (or characteristics) to the AMF 1104 when it is identified that the scheduling characteristic such as the TDD cycle is reconfigured or the scheduling information such as the TDD cycle of the newly connected cell is updated by the handover of the UE operation S1205.

In operation S1210, the NG-RAN 1102 may transmit scheduling information (or characteristics) such as updated TDD cycle information to the SMF 1105 via the AMF 1104. In this case, the transferred information may include PDU session ID, flow descriptor, QoS info (GFBR, CN-PDB, and AN-PDB), and TDD cycle info.

In operation S1215, the SMF 1105 may perform a necessary modification task, such as conversion between the master times referred to between the external application and the 5GS system, on the information received from the AMF 1104. In other words, the SMF 1105 may perform time conversion on scheduling information such as a TDD cycle if necessary.

In operation S1220, the SMF 1105 transfers the updated scheduling information to the TSCTSF 1108 via the PCF 1106. In this case, the transferred information may include PDU session ID, flow descriptor, QoS info (GFBR, CN-PDB, and AN-PDB), and TDD cycle info.

In operation S1225, the TSCTSF 1108 may identify the received scheduling information such as TDD cycle.

In operation S1230, the TSCTSF 1108 may send a response to the TSC/QoS request to the AF 1109 directly or via the NEF. In this case, if the TSCTSF 1108 has already sent a response to the TSC/QoS request in operation 1120*a*, the TSCTSF 308 may transmit information to the AF 1109 in the TSC/QoS notification format. In this case, the transferred information may include GPSI, transaction ID, and TDD cycle info.

In operation S1235, the AF 1109 may generate or update the proposed periodicity in consideration of the initial periodicity and the P-range and based on the received scheduling information (e.g., the TDD cycle). Further, the proposed BAT may be generated or updated in consideration of the initial BAT and the BAT-range and based on the scheduling information. Thereafter, the AF 1109 may adjust application scheduling based on the generated or updated information. In other words, for DL scheduling, the stream generation and transmission time of the server may be adjusted, and for UL scheduling, the stream generation and transmission time of the UE may be adjusted.

In operation S1240, the AF 1109 may update the TSCAI up to the NG-RAN 1102 by using the procedure of operation S1115 to operation S1145 to include the generated proposed periodicity and proposed BAT.

Figure 13:
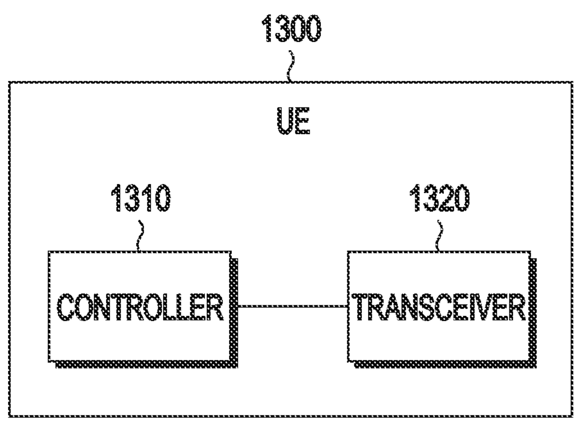
FIG. 13 is a view illustrating a structure of a UE according to an embodiment of the disclosure.

FIG. 13 is a view illustrating a structure of a UE according to an embodiment of the disclosure.

Referring to FIG. 13, according to an embodiment, a UE may include at least one controller (or a processor) 1310 and a transceiver 1320 including a receiver and a transmitter. The UE may include a memory (not shown). The transceiver 1320 and the memory may be connected to the at least one controller 1310 to be operated under the control of the at least one controller 1310.

At least one controller 1310 may control a series of processes so that the operations of the UE described in connection with the embodiments of FIGS. 1, 2, 3A, 3B, 4, 5A, 5B, 6, 7A, 7B, 8, 9A, 9B, 10, 11A, 11B, and 12 may be performed. The transceiver 1320 may transmit and receive signals to/from the base station 1400, the application function entity 1500 and the network entity 1600. The signals may include control information and data.

Figure 14:
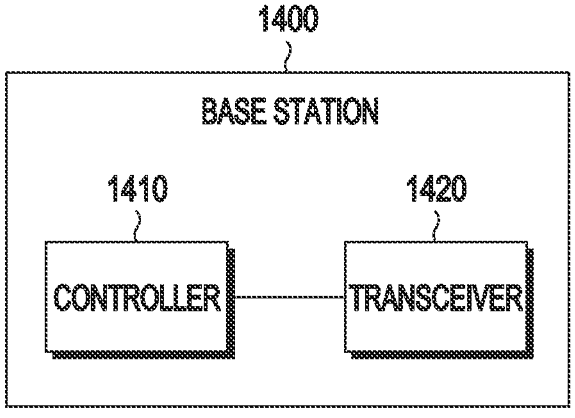
FIG. 14 is a view illustrating a structure of a base station (RAN) according to an embodiment of the disclosure.

FIG. 14 is a view illustrating a structure of a base station (RAN) according to an embodiment of the disclosure.

Referring to FIG. 14, according to an embodiment, a base station may include at least one controller (or a processor) 1410 and a transceiver 1420 including a receiver and a transmitter. The base station may include a memory (not shown). The transceiver 1420 and the memory may be connected to the at least one controller 1410 to be operated under the control of the at least one controller 1410.

The at least one controller 1410 may control operations of the base station ((NG-)RAN) described in connection with FIGS. 1, 2, 3A, 3B, 4, 5A, 5B, 6, 7A, 7B, 8, 9A, 9B, 10, 11A, 11B, and 12 of the disclosure to be performed. The transceiver 1420 may transmit and receive signals to/from the UE 1300, the application function entity 1500 and the network entity 1600.

Figure 15:
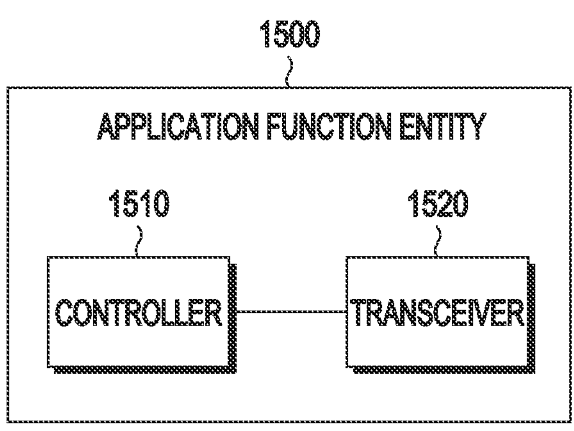
FIG. 15 is a view illustrating a structure of an application function (AF) entity according to an embodiment of the disclosure.

FIG. 15 is a view illustrating a structure of an application function (AF) entity according to an embodiment of the disclosure. An application function (AF) entity may be a concept encompassing an external application or application server.

Referring to FIG. 15, according to an embodiment, an application function may include at least one controller (e.g., a processor) 1510 and a transceiver 1520 including a receiver and a transmitter. The application function may include a memory (not shown). The transceiver 1520 and the memory may be connected to the at least one controller 1510 to be operated under the control of the at least one controller 1510.

The at least one controller 1510 may control operations of the application function (AF) described in connection with FIGS. 1, 2, 3A, 3B, 4, 5A, 5B, 6, 7A, 7B, 8, 9A, 9B, 10, 11A, 11B, and 12 of the disclosure to be performed. The transceiver 1520 may transmit and receive signals to/from the UE 1300, the base station 1400 and the network entity 1600.

Figure 16:
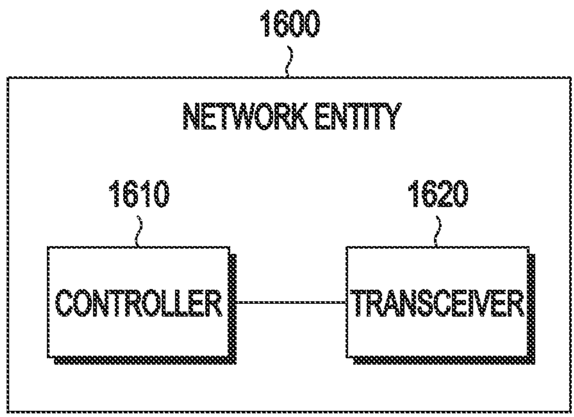
FIG. 16 is a view illustrating a structure of a network device (or communication network or network entity) according to an embodiment of the disclosure.

FIG. 16 is a view illustrating a structure of a network device (or communication network or network entity) according to an embodiment of the disclosure.

Referring to FIG. 16, according to an embodiment, a network entity may include at least one controller (e.g., a processor) 1610 and a transceiver 1620 including a receiver and a transmitter. The network device may include a memory (not shown). The transceiver 1620 and the memory may be connected to the at least one controller 1610 to be operated under the control of the at least one controller 1610.

At least one controller 1610 may control a series of processes so that the operations of the network device (or communication network, 5G core network, or network entity) are described in connection with the embodiments of FIGS. 1, 2, 3A, 3B, 4, 5A, 5B, 6, 7A, 7B, 8, 9A, 9B, 10, 11A, 11B, and 12 may be performed. The transceiver 1620 may transmit and receive signals to/from the UE 1300, the base station 1400 and the application function entity 1500. The signals may include control messages and data information.

The network entity 1600 may include all devices corresponding to network function entities, such as TSCTSF, NEF, NF, unified data repository (UDR)/unified data management (UDM), AMF, UPF, SMF, and PCF according to the disclosure, and the network function entities may be independently configured.

The methods according to the embodiments described in the specification or claims of the disclosure may be implemented in hardware, software, or a combination of hardware and software.

When implemented in software, there may be provided a computer-readable storage medium storing one or more programs (software modules). One or more programs stored in the computer-readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Or, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An application function (AF) entity in a wireless communication system, the AF entity comprising:

a transceiver; and at least one processor, wherein the at least one processor is configured to:

transmit, to a base station via at least one network entity, information for traffic scheduling, wherein the information for traffic scheduling includes a periodicity range and a burst arrival time (BAT) range, the periodicity range indicates a range of a periodicity configured to be adjusted by the AF entity, and the BAT range indicates a range of a BAT configured to be adjusted by the AF entity, receive, from the base station via the at least one network entity, a response including information on a first periodicity for adjusting the periodicity for traffic transmission and information on a first BAT for adjusting the BAT for traffic transmission, and adjust scheduling of an application based on the information on the first periodicity and the information on the first BAT, wherein the information on the first periodicity and the information on the first BAT are determined in the periodicity range and the BAT range.

2. The AF entity of claim 1, wherein the information for traffic scheduling includes at least one of:

a capability indication for scheduling adaptation, an initial periodicity, an initial BAT, or an uplink/downlink flow direction.

3. The AF entity of claim 1, wherein the information for traffic scheduling is included in time sensitive communication assistance information (TSCAI) by a session management function (SMF) entity, and wherein the TSCAI is transmitted to the base station.

4. The AF entity of claim 1, wherein the information on the first periodicity and the information on the first BAT are included in the response, in case that the information for traffic scheduling includes a capability indication for scheduling adaptation.

5. A base station in a wireless communication system, the base station comprising:

a transceiver; and at least one processor, wherein the at least one processor is configured to:

receive, from an application function (AF) entity via at least one network entity, information for traffic scheduling, wherein the information for traffic scheduling includes a periodicity range and a burst arrival time (BAT) range, the periodicity range indicates a range of a periodicity configured to be adjusted by the AF entity, and the BAT range indicates a range of a BAT configured to be adjusted by the AF entity, determine information on a first periodicity for adjusting the periodicity for traffic transmission and information on a first BAT for adjusting the BAT for traffic transmission in the periodicity range and the BAT range, and transmit, to the AF entity via the at least one network entity, a response including the information on the first periodicity and the information on the first BAT.

6. The base station of claim 5, wherein the information for traffic scheduling includes at least one of:

a capability indication for scheduling adaptation, an initial periodicity, an initial BAT, or an uplink/downlink flow direction.

7. The base station of claim 5, wherein the at least one processor is further configured to receive the information for traffic scheduling in time sensitive communication assistance information (TSCAI), and wherein the information for traffic scheduling is included in the TSCAI by a session management function (SMF) entity.

8. The base station of claim 5, wherein the information on the first periodicity and the information on the first BAT are included in the response, in case that the information for traffic scheduling includes a capability indication for scheduling adaptation.

9. A method performed by an application function (AF) in a wireless communication system, the method comprising:

transmitting, to a base station via at least one network entity, information for traffic scheduling, wherein the information for traffic scheduling includes a periodicity range and a burst arrival time (BAT) range, the periodicity range indicates a range of a periodicity configured to be adjusted by the AF, and the BAT range indicates a range of a BAT configured to be adjusted by the AF;

receiving, from the base station via the at least one network entity, a response including information on a first periodicity for adjusting the periodicity for traffic transmission and information on a first BAT for adjusting the BAT for traffic transmission; and adjusting scheduling of an application based on the information on the first periodicity and the information on the first BAT, wherein the information on the first periodicity and the information on the first BAT are determined in the periodicity range and the BAT range.

10. The method of claim 9, wherein the information for traffic scheduling includes at least one of:

a capability indication for scheduling adaptation,
an initial periodicity,
an initial BAT, or
an uplink/downlink flow direction.

11. The method of claim 9, wherein the information for traffic scheduling is included in time sensitive communication assistance information (TSCAI) by a session management function (SMF), and wherein the TSCAI is transmitted to the base station.

12. The method of claim 9, wherein the information on the first periodicity and the information on the first BAT are included in the response, in case that the information for traffic scheduling includes a capability indication for scheduling adaptation.

13. A method performed by a base station in a wireless communication system, the method comprising:

receiving, from an application function (AF) via at least one network entity, information for traffic scheduling, wherein the information for traffic scheduling includes a periodicity range and a burst arrival time (BAT) range, the periodicity range indicates a range of a periodicity configured to be adjusted by the AF, and the BAT range indicates a range of a BAT configured to be adjusted by the AF;

determining information on a first periodicity for adjusting the periodicity for traffic transmission and information on a first BAT for adjusting the BAT for traffic transmission in the periodicity range and the BAT range; and transmitting, to the AF via the at least one network entity, a response including the information on the first periodicity and the information on the first BAT.

14. The method of claim 13, wherein the information for traffic scheduling includes at least one of:

a capability indication for scheduling adaptation,
an initial periodicity,
an initial BAT, or
an uplink/downlink flow direction.

15. The method of claim 13, wherein receiving the information for traffic scheduling comprises receiving the information for traffic scheduling in time sensitive communication assistance information (TSCAI), and wherein the information for traffic scheduling is included in the TSCAI by a session management function (SMF).

16. The method of claim 13, wherein the information on the first periodicity and the information on the first BAT are included in the response, in case that the information for traffic scheduling includes a capability indication for scheduling adaptation.

* * * * *